United States Patent
Kusumura

(10) Patent No.: US 8,892,574 B2
(45) Date of Patent: Nov. 18, 2014

(54) SEARCH APPARATUS, SEARCH METHOD, AND NON-TRANSITORY COMPUTER READABLE MEDIUM STORING PROGRAM THAT INPUT A QUERY REPRESENTING A SUBSET OF A DOCUMENT SET STORED TO A DOCUMENT DATABASE AND OUTPUT A KEYWORD THAT OFTEN APPEARS IN THE SUBSET

(75) Inventor: Yukitaka Kusumura, Tokyo (JP)

(73) Assignee: NEC Corporation, Tokyo (JP)

( * ) Notice: Subject to any disclaimer, the term of this patent is extended or adjusted under 35 U.S.C. 154(b) by 315 days.

(21) Appl. No.: 13/129,342

(22) PCT Filed: Nov. 6, 2009

(86) PCT No.: PCT/JP2009/005907
§ 371 (c)(1),
(2), (4) Date: May 13, 2011

(87) PCT Pub. No.: WO2010/061537
PCT Pub. Date: Jun. 3, 2010

(65) Prior Publication Data
US 2011/0219000 A1    Sep. 8, 2011

(30) Foreign Application Priority Data
Nov. 26, 2008 (JP) .................. 2008-300793

(51) Int. Cl.
*G06F 17/30* (2006.01)
(52) U.S. Cl.
CPC ............................... *G06F 17/30687* (2013.01)
USPC ....................................... 707/750; 707/737

(58) Field of Classification Search
CPC .................................................. G06F 17/30687
USPC ....................................... 707/737, 750
See application file for complete search history.

(56) References Cited

U.S. PATENT DOCUMENTS

| | | | |
|---|---|---|---|
| 5,675,819 A * | 10/1997 | Schuetze ..................... 704/10 |
| 5,926,812 A * | 7/1999 | Hilsenrath et al. ........... 707/737 |
| 6,772,141 B1 * | 8/2004 | Pratt et al. ............. 707/999.003 |
| 6,772,170 B2 * | 8/2004 | Pennock et al. ....... 707/999.102 |
| 6,847,966 B1 * | 1/2005 | Sommer et al. ............... 707/739 |
| 7,003,516 B2 * | 2/2006 | Dehlinger et al. ............ 707/750 |

(Continued)

FOREIGN PATENT DOCUMENTS

| | | |
|---|---|---|
| JP | 6-274541 A | 9/1994 |
| JP | 10-74210 A | 3/1998 |

(Continued)

OTHER PUBLICATIONS

I. Yoshida et al., "Software Architecture for Interactive Text Mining", ProVISION No. 52, 2007, pp. 71-78, Abstract only.

(Continued)

*Primary Examiner* — Rehana Perveen
*Assistant Examiner* — Scott A Waldron
(74) *Attorney, Agent, or Firm* — Sughrue Mion, PLLC

(57) ABSTRACT

Provided is a search apparatus, a search method, and a program that can improve search speed for a document set even when an object to be searched is a large-scale document set. A search apparatus, in an embodiment, includes an abstract matrix storage unit, a word frequency calculation unit, and a document frequency reference unit.

13 Claims, 24 Drawing Sheets

(56) References Cited

U.S. PATENT DOCUMENTS

| | | | | |
|---|---|---|---|---|
| 7,392,175 | B2* | 6/2008 | Kawatani | 704/9 |
| 8,095,652 | B2* | 1/2012 | Rudy et al. | 709/224 |
| 8,190,613 | B2* | 5/2012 | Takuma et al. | 707/741 |
| 8,311,805 | B2* | 11/2012 | Parikh | 704/9 |
| 2004/0122656 | A1* | 6/2004 | Abir | 704/4 |

FOREIGN PATENT DOCUMENTS

| | | |
|---|---|---|
| JP | 11-25108 A | 1/1999 |
| JP | 2001014341 A | 1/2001 |
| JP | 2002032394 A | 1/2002 |
| JP | 2003248686 A | 9/2003 |
| JP | 2003345811 A | 12/2003 |
| JP | 2007108867 A | 4/2007 |
| WO | 2009001696 A | 12/2008 |

OTHER PUBLICATIONS

I. S. Dhillon et al., "Information-Theoretic Co-clustering", In Proceedings of ACM SIGKDD International Conference. 2003, pp. 89-98.

T. Hofmann "Probabilistic Latent Semantic Analysis" In Proceedings of Conference on Uncertainty in Artificial Intelligence, 1999, pp. 289-296.

Y. Takayama et al., "An information Retrieval System based on Word Associations—InfoMap" IPSJ SIG Notes, vol. 99, No. 20, Mar. 1, 1999, pp. 1-8, Abstract only.

International Search Report for PCT/JP2009/005907 mailed Jan. 12, 2010.

A. Takano et al., "Development of the genetic association engine for processing large corpora", 19th IPA Symposium, Oct. 2000.

I. Yoshida et al., "Software Architecture for Interactive Text Mining", ProVISION No.52, 2007, pp. 71-78.

I. S. Dhillon et al., "Information-Theoretic Co-clustering", In Proceedings of ACM SIGKDD International Conference. 2003, pp. 89-98.

W. Xu et al., "Document Clustering Based on Non-negative Matrix Factorization", In Proceedings of ACM SIGIR International Conference, 2003, pp. 267-273.

T. Hofmann "Probabilistic Latent Semantic Analysis", In Proceedings of Conference on Uncertainty in Artificial Intelligence, 1999, pp. 289-296.

Y. Takayama et al., "An information Retrieval System based on Word Associations—InfoMap" IPSJ SIG Notes, vol. 99, No. 20, Mar. 1, 1999, pp. 1-8.

* cited by examiner

| DOCUMENT NUMBER | BODY |
|---|---|
| 1 | ARRESTED CITY COUNCILOR OF AB CITY OVER SUSPICION OF BRIBERY... |
| 2 | 8.8 % REDUCED SALE OF GASOLINE, HOLDING OFF BUYING DUE TO SOARING PRICE... |
| 3 | ARRESTED SUSPECT EF FOR MURDER ARSON BY GASOLINE IN CD CITY... |
| 4 | LESS PEOPLE RETURNING HOME BY PRIVATE CAR DUE TO SOARING GASOLINE PRICE? SLIGHT INCREASE OF TRAIN USAGE IN BON VACATION... |
| 5 | PROSECUTED SUSPECT GH FOR ATTEMPTED MURDER IN SERIAL STABBING INCIDENT IN AB CITY... |
| 6 | TRANSPORT INDUSTRY GROUP APPEALED FOR MEASURES AGAINST SOARING GASOLINE PRICE AT HEADQUARTER OF PARTY Y ... |
| 7 | ARRESTED WANTED MAN FOR ATTEMPTED MURDER WHO STABBED TWO SISTERS WITH KNIFE. ARRESTED MAN WAS SUSPECT IJ ... |

Fig. 1

DOCUMENT 1, 2, 3, 4, 5, 6, 7 ...
↓ ↓ ↓ ↓ ↓ ↓ ↓

| WORD | | |
|---|---|---|
| "SUSPICION" → | 1, 0, 1, 0, 1, 0, 1... |
| "GASOLINE" → | 0, 1, 1, 1, 0, 1, 0... |
| "ARREST" → | 1, 0, 1, 0, 0, 0, 1... |
| "SOARING" → | 0, 1, 0, 1, 0, 1, 0... |
| "MURDER" → | 0, 0, 1, 0, 1, 0, 1... |
| "PRICE" → | 0, 0, 0, 1, 0, 1, 0... |
| "INCIDENT" → | 0, 0, 1, 0, 1, 0, 0... |
| "AB" → | 1, 0, 0, 0, 1, 0, 0... |
| "PARTY Y" → | 0, 0, 0, 0, 0, 1, 0... |

Fig. 2

| WORD | WORD NUMBER |
|---|---|
| SUSPICION | 1 |
| GASOLINE | 2 |
| ARREST | 3 |
| SOARING | 4 |
| MURDER | 5 |
| ... | ... |

Fig. 5A

| WORD NUMBER | WORD NUMBER |
|---|---|
| 1 | 1, 3, 5, 7··· |
| 2 | 2, 3, 4, 6··· |
| 3 | 1, 3, 7··· |
| 4 | 2, 4, 6··· |
| 5 | 3, 5, 7··· |
| ... | ... |

Fig. 5B

| WORD NUMBER | WORD REGION NUMBER |
|---|---|
| 1 | 0 |
| 2 | 1 |
| 3 | 0 |
| 4 | 1 |
| 5 | 0 |

Fig. 6A

| DOCUMENT NUMBER | DOCUMENT REGION NUMBER |
|---|---|
| 1 | 0 |
| 2 | 1 |
| 3 | 0 |
| 4 | 1 |
| 5 | 0 |

Fig. 6B

|  | DOCUMENT REGION DC[0] | DOCUMENT REGION DC[1] | DOCUMENT REGION DC[2] | DOCUMENT REGION DC[3] |
|---|---|---|---|---|
| WORD REGION WC [0] | 48 | 1 | 0 | 7 |
| WORD REGION WC [1] | 5 | 30 | 0 | 0 |
| WORD REGION WC [2] | 0 | 1 | 45 | 1 |
| WORD REGION WC [3] | 3 | 0 | 1 | 49 |

Fig. 9

|  | DOCUMENT REGION DC[0] | DOCUMENT REGION DC[1] | DOCUMENT REGION DC[2] | DOCUMENT REGION DC[3] |
|---|---|---|---|---|
| WORD REGION WC [0] | {1,1,1,1...} | {0,0,0...} | {1,1,0...} | {0,0,1,0,1...} |
| WORD REGION WC [1] | {0,1,0,0...} | {1,1,1...} | {0,0,0...} | {1,0,0,1,1...} |
| WORD REGION WC [2] | {0,0,0,1...} | {1,0,0...} | {1,1,1...} | {1,0,0,0,0...} |
| WORD REGION WC [3] | {0,1,1,0...} | {0,0,1...} | {0,1,0...} | {1,1,1,1,1...} |

Fig. 10

|  | DOCUMENT REGION DC[0] | DOCUMENT REGION DC[1] | DOCUMENT REGION DC[2] | DOCUMENT REGION DC[3] |
|---|---|---|---|---|
| WORD REGION WC [0] | 19 | 1 | 0 | 7 |
| WORD REGION WC [1] | 5 | 30 | 0 | 0 |
| WORD REGION WC [2] | 0 | 1 | 3 | 1 |
| WORD REGION WC [3] | 3 | 0 | 1 | 2 |

Fig. 11

| WORD REGION | UPPER LIMIT VALUE |
|---|---|
| 0 | 27 |
| 1 | 35 |
| 2 | 5 |
| 3 | 6 |

Fig. 12

| WORD NUMBER | DOCUMENT NUMBER LIST |
|---|---|
| 1 | 1, 3, 5, 7··· |
| 3 | 1, 3, 7··· |
| 5 | 3, 5, 7··· |
| ··· | ··· |

| POSITION | DOCUMENT NUMBER |
|---|---|
| 1 | 1 |
| 2 | 2 |
| 3 | 3 |
| 4 | 4 |
| 5 | 10 |
| 6 | 15 |

Fig. 18

| WORD REGION | UPPER LIMIT VALUE | NO. OF WORD |
|---|---|---|
| 0 | 40 | 25 |
| 1 | 10 | 25 |
| 2 | 5 | 25 |
| 3 | 5 | 25 |

Fig. 27A

| WORD REGION | UPPER LIMIT VALUE | NO. OF WORD |
|---|---|---|
| 0 | 40 | 20 |
| 1 | 30 | 20 |
| 2 | 5 | 20 |
| 3 | 5 | 20 |
| 4 | 5 | 20 |

Fig. 27B

SEARCH APPARATUS, SEARCH METHOD, AND NON-TRANSITORY COMPUTER READABLE MEDIUM STORING PROGRAM THAT INPUT A QUERY REPRESENTING A SUBSET OF A DOCUMENT SET STORED TO A DOCUMENT DATABASE AND OUTPUT A KEYWORD THAT OFTEN APPEARS IN THE SUBSET

The present application is the National Phase of PCT/JP2009/005907, filed Nov. 6, 2009, which claims priority rights of and is based on Japanese Patent Application Ser. No. 2008-300793 filed on Nov. 26, 2008 in the Japanese Patent Office, the entire contents of which are hereby incorporated by reference.

TECHNICAL FIELD

The present invention relates to a search apparatus, a search method, and a recording medium storing a program that input a query representing a subset of a document set stored to a document database and output a keyword that often appears in the subset.

BACKGROUND ART

Heretofore, in order to extract necessary information from a large amount of documents, development of a search apparatus for characteristic words has been performed. As a method to realize the search of characteristic words, a method can be considered which reads each document in order according to an input list of document numbers, counts the number of words included in the document, and extracts highly frequent words as characteristic. However, as this reading process of documents is a random access and it is necessary to repeatedly read document data, there is a problem that the search speed is slow. Further, although an approach can be considered which samples the document to read and read only a part of the document, there is a problem in this method that the accuracy is greatly reduced.

In order to address such problem, for example, Non Patent document 1 discloses a search system which compacts a list of words that appear in a document with a document number as a key, and performs search in a state that the compacted list is held to a memory as data for associating document words. Since the search system disclosed in Non Patent document 1 can refer to a sequence of words included in the input document list at a high speed by the data in the memory, a related word can be returned at a high speed.

Moreover, Non Patent document 2 discloses a search system including as components, a frequency-ordered index obtained by sorting inverted indexes included in a document set in order of frequency, and a means to accept queries to this frequency-ordered index.

In response to the query, the search system disclosed in Non Patent document 2 firstly reads the frequency-ordered index in ascending order (in order of highly frequent words). Next, this search system compares a list of document numbers for each word with an input document list, and determines the frequency of each word within the document set that is specified by the input document list.

This process ends at the time when a frequency f(k) of the kth word which has been read becomes greater than a frequency of a word in the frequency ordered-index to be read next in the document set (all the document sets to be searched). As described above, as the reading process is performed in the same order every time according to the frequency-ordered index, sequential access of the reading process can be realized. Therefore, according to the search system disclosed in Non Patent document 2, it is considered that the search speed can be improved.

CITATION LIST

Non Patent Literature

[Non Patent document 1] Akihiko Takano et al. "Development of the generic association engine for processing large corpora", 19th IPA Symposium, 2000.
[Non Patent document 2] Issei Yoshida and Daisuke Takuma "Software architecture for interactive text mining", ProVISION No. 52, 2007, p. 71 to 78.

SUMMARY OF INVENTION

Technical Problem

However, since it is required for the search system disclosed in Non Patent document 1 that the data for associating document words is stored to the memory, there is a problem that only the document that can be stored to the memory is processed. In order to increase the amount of the document, the capacity of the memory must be greatly increased.

For example, assume that an average of 1000 words is included in ten million documents. At this time, when an identifier representing a word is compacted to an average of two bytes, the amount of the memory required for the system to operate will be 20 GB, thereby requiring a large memory amount. Therefore, in the search system disclosed in Non Patent document 1, especially in the case that a large-scale document set is to be searched, in practice, the improvement of search speed is difficult.

Further, in the search system disclosed in Non Patent document 2, if distribution of words largely differs between a document set specified by a query and an entire document set, it is necessary to compare with the input document list after reading a list of document numbers for a large amount of words. Therefore, improvement in the search speed is insufficient even by the search system disclosed in Non Patent document 2.

The purpose of the present invention is to provide a search apparatus, a search method, and a recording medium storing a program that solve the above problem and is able to speed up the search in a document set even if an object to search is a large-scale document set.

Solution to Problem

In order to achieve the above purpose, a search apparatus according to the present invention is a search apparatus for searching a word characteristic to a subset from a document set, and includes an abstract matrix storage unit, a region upper limit calculation unit, a word frequency calculation unit, and a document frequency reference unit, in which the abstract matrix storage unit, when information which is created from a plurality of regions obtained by dividing a matrix representing a co-occurrence relationship between a word set and a document set and which also represents a subset included in the document set is provided, stores information which enables calculation or estimation of a frequency of a word in each of the plurality of regions as abstract information, the region upper limit calculation unit, when the information representing the subset is input, examines a relationship between the information representing the subset and the plurality of regions, refers to the abstract information for each of the plurality of regions from the obtained result, and calculates, for each of the plurality of regions, an upper limit of the frequency of the word included in each of the plurality of regions for the subset, the word frequency calculation unit adds the upper limit of the frequency for each of the plurality of regions by each region with a common word, and specifies the obtained added value as the upper limit of the frequency of the word for each region with the common word, and the document frequency reference unit obtains a region to be searched according to the upper limit of the frequency of the word for each region with the common word, further specifies a specified number of words in order of higher frequency according to the obtained region to be searched, and outputs the specified word as a word characteristic to the subset.

Further, in order to achieve the above purpose, a search method according to the present invention is a search method for searching a word characteristic to a subset from a document set, and includes (a) a step for, when information which is created from a plurality of regions obtained by dividing a matrix representing a co-occurrence relationship between a word set and a document set and which also represents a subset included in the document set is provided, storing information which enables calculation or estimation of a frequency of a word in each of the plurality of regions as abstract information, (b) a step for, when the information representing the subset is input, examining a relationship between the information representing the subset and the plurality of regions, referring to the abstract information for each of the plurality of regions from the obtained result, and calculating, for each of the plurality of regions, an upper limit of the frequency of the word included in each of the plurality of regions for the subset, (c) a step for adding the upper limit of the frequency for each of the plurality of regions by each region with the common word, and specifying the obtained added value as the upper limit of the frequency of the word for each region with the common word, and (d) obtaining a region to be searched according to the upper limit of the frequency of the word for each region with the common word, further specifying a specified number of words in order of higher frequency according to the obtained region to be searched, and outputting the specified word as a word characteristic to the subset.

Furthermore, in order to achieve the above purpose, a recording medium storing a program according to the present invention is a recording medium storing a program for causing a computer to search a word characteristic to a subset from a document set, and causes the computer to execute (a) a process that, when information which is created from a plurality of regions obtained by dividing a matrix representing a co-occurrence relationship between a word set and a document set and which also represents a subset included in the document set is provided, stores information which enables calculation or estimation of a frequency of a word in each of the plurality of regions as abstract information, (b) a process that, when the information representing the subset is input, examines a relationship between the information representing the subset and the plurality of regions, refers to the abstract information for each of the plurality of regions from the obtained result, and calculates, for each of the plurality of regions, an upper limit of the frequency of the word included in each of the plurality of regions for the subset, (c) a process that adds the upper limit of the frequency for each of the plurality of regions by each region with the common word, and specifies the obtained added value as the upper limit of the frequency of the word by each region with the common word, and (d) a process that obtains a region to be searched according to the upper limit of the frequency of the word for each region with the common word, further specifies a specified number of words in order of higher frequency according to the obtained region to be searched, and outputs the specified word as a word characteristic to the subset.

Advantageous Effects of Invention

As described so far, according to the search apparatus, the search method, and the recording medium storing the program of the present invention, even if an object to be searched is a large-scale document set, as it is possible to narrow down the data that must be read at the time of search, characteristic words can be calculated at a high speed.

BRIEF DESCRIPTION OF DRAWINGS

FIG. 1 is a view showing an example of a "document" according to the present invention;

FIG. 2 is a view showing an example of a "word document matrix" according to the present invention;

FIG. 5A is a view showing a word table, which is an example of a data structure stored to a word document matrix storage unit shown in FIG. 1;

FIG. 5B is a view showing a word index, which is an example of the data structure stored to the word document matrix storage unit shown in FIG. 1;

FIG. 6A is a view showing a word region list, which is an example of an output by a cluster creation unit 5 shown in FIG. 1;

FIG. 6B is a view showing a word region list, which is an example of the output by the cluster creation unit 5 shown in FIG. 1;

FIG. 9 is a view showing an example of an abstract matrix according to the first exemplary embodiment;

FIG. 10 is a view showing an example of the abstract matrix according to the first exemplary embodiment;

FIG. 11 is a view showing an example of a region upper limit matrix according to the first exemplary embodiment;

FIG. 12 is a view showing an example of a word upper limit list according to the first exemplary embodiment;

FIG. 18 is a view showing an example of a correspondence table created by a vector abstract creation unit;

FIG. 27A is a view showing an example of a word upper limit list obtained in an example 2; and FIG. 27B is a view showing an example of the word upper limit list obtained in the example 2.

DESCRIPTION OF EMBODIMENTS

Figure 3:
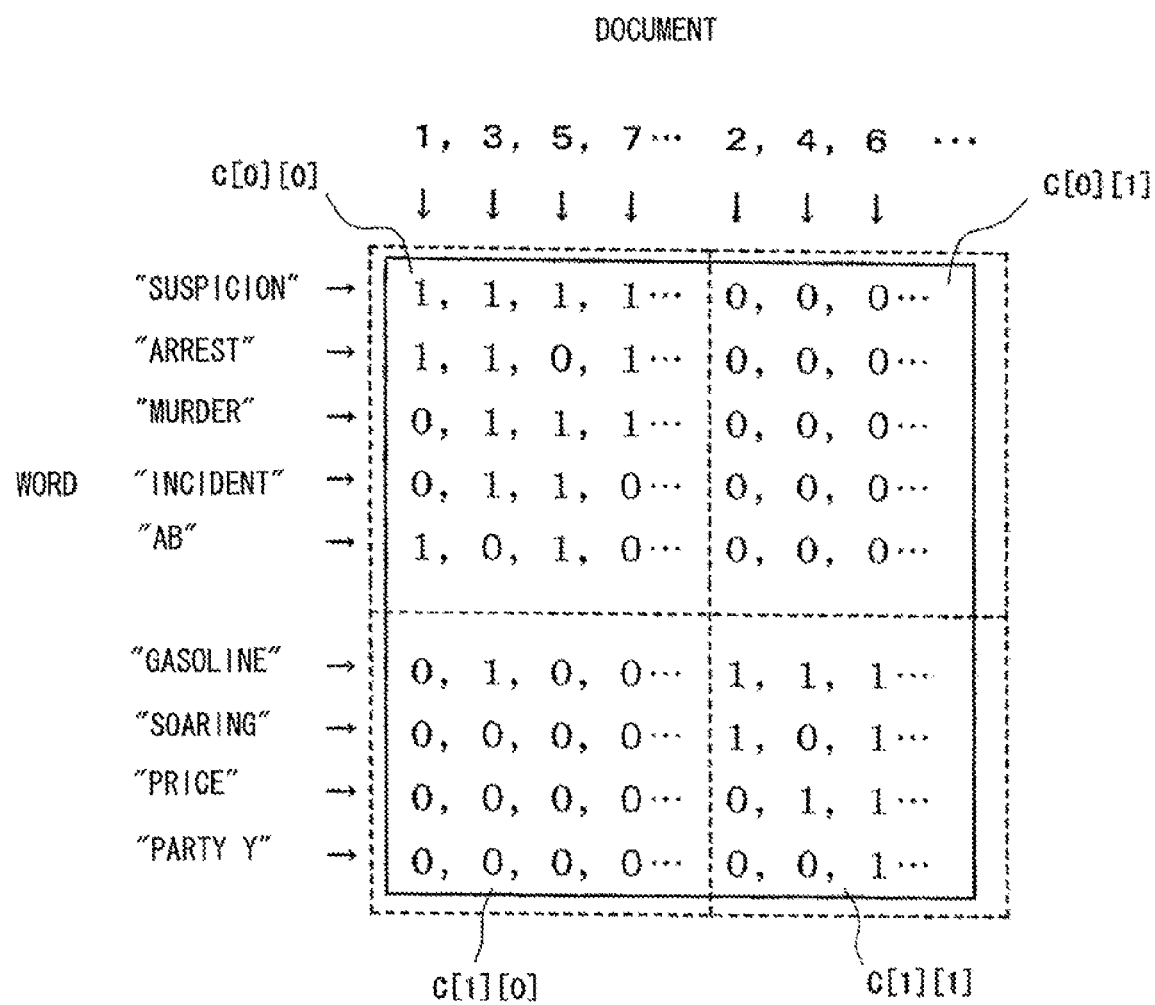
FIG. 3 is a view showing an example of dividing the word document matrix shown in FIG. 2.

Firstly before describing exemplary embodiments in the present invention, the vocabulary used in order to explain the present invention in this specification is defined using FIGS. 1 to 3. First, in the present invention, a "document" is defined as information that includes at least a body composed of strings, and an identifier that identifies the document (for example, an arbitrary integer value. Hereinafter referred to as a "document number"). FIG. 1 is a view showing an example of the "document" in the present invention. In the example of FIG. 1, the document numbers and bodies for seven documents are shown.

Moreover, in the present invention, a "word" is defined as a string that is extracted from the body in the document according to some kind of standard such as morphological analysis and N gram (a string is divided for every N character). Note that the "word" may include a term or a phrase (for example, "fruit" or "fuel") regarding the meaning that is recognized to be included in the document by the morphological analysis or semantic analysis, not only terms that appear in the body (for example, "apple" and "gasoline" or the like).

Further, in the present invention, a matrix representing the co-occurrence relationship between the "document" and the "word" is defined as a "word document matrix". FIG. 2 is a view showing an example of the "word document matrix" in the present invention. In FIG. 2, the "word document matrix" for the seven documents shown in FIG. 1 is shown within the black line frame.

The word document matrix of FIG. 2 represents words appearing in a document set by each row, and each document by each column. Each row indicates whether the corresponding word appears in each document (the case that appears shall be 1 and the case that does not appear shall be 0). For example, the word "suspicion" of the first row appears in document 1, document 3, document 5, and document 7. The word "gasoline" of the second row also appears in document 2, document 3, document 4, and document 6.

Furthermore, a "frequency" in the document set of the word is defined as the number of documents including this word in this document set. For example, the "frequency" in the document set of seven documents shown in FIG. 1 of the word "gasoline" is four. Moreover, in the subsequent explanation, for a word with high "frequency", an expression such as a highly frequent word or a high frequency word may be used.

The search device according to the present invention searches a set of certain documents (document set) Dall, and further inputs information that represents at least a subset of the document set Dall (document set D), for example a list of document numbers (hereinafter referred to as an input document list). Then, the search device according to the present invention outputs a list of top k words with high frequency within the document set D out of a word set W which appears in the document set D. Such a search device is also referred to as an associative search engine. Moreover, such a search device is useful when searching for a highly frequent word which indicates a concept that has close relationship with a document set expressed in a certain query, in a text-mining system and a search engine.

Here, a "region", a "word region", and a "document region" in the word document matrix are further defined using FIG. 3. FIG. 3 is a view showing an example of dividing the word document matrix in FIG. 2. FIG. 3 shows an example in which the word document matrix for the document set shown in FIG. 1 is divided into four parts along the dotted lines.

The "region" means a part of the word document matrix, which is obtained by dividing in horizontal and vertical directions by categorizing the document set into a plurality of subsets, and categorizing the word set into a plurality of subsets in the word document matrix. Note that in the following explanation, the number of word regions in a word document matrix WD shall be m, and the number of document regions shall be n. Further, a set of regions shall be C, and each region may be expressed as $C[i][j]\{0<=i<m, 0<=j<n\}$. In the example of FIG. 3, the word document matrix is divided into four regions, which are $C[0][0]$, $C[0][1]$, $C[1][0]$, and $C[1][1]$.

The "word region" means a part of the word document matrix generated by categorizing only the word set into a plurality of subsets in the word document matrix. Note that in the following explanation, a set of word regions for a certain word document matrix shall be WC, and each word region may be expressed as $WC[i]\{0<=i<m\}$. In the example of FIG. 3, the word region composed of $C[0][0]$ and $C[0][1]$ can be expressed as $WC[0]$, and the word region composed of $C[1][0]$ and $C[1][1]$ can be expressed as $WC[1]$.

The "document region" means a part of the word document matrix generated by categorizing only a document set into a plurality of subsets in a word document matrix. Note that in the following explanation, a set of document regions shall be DC and each document region may be expressed as $DC[j]\{0<=j<n\}$. For example, in the example of FIG. 3, the document region composed of DC[0][0] and C[0][1] can be defined as DC[0], and the document region composed of C[0][1] and C[1][1] can be defined as DC[1].

Moreover, as the vocabulary to express the document frequency regarding the "region", the "word region", and the "document region", a "region frequency", a "static region frequency", and a "dynamic region frequency" are defined as follows. The "region frequency" for a region C[i][j] of a word W in a certain document set is defined as the number of documents in which the word appears in the region C[i][j]. For example, in the example of FIG. 3, the region frequency inside the region C[1][0] for the word "gasoline" will be one, and the region frequency in the region C[1][1] will be three.

Further, the "region frequency" in a word region WC[i] of the word "W" is similarly defined as the number of documents in which the word W appears in the word region WC[i]. Furthermore, the "region frequency" in a document region DC[j] of the word "W" is similarly defined as the number of documents in which the word W appears in the word region DC[i]. Then, the region frequency for the region C[i][j] of the word W in the entire document set Dall is referred to as the "static region frequency", and the region frequency for the region C[i][j] of the word W in the document set D to be input is referred to as the dynamic region frequency.

[First Exemplary Embodiment]

Figure 4:
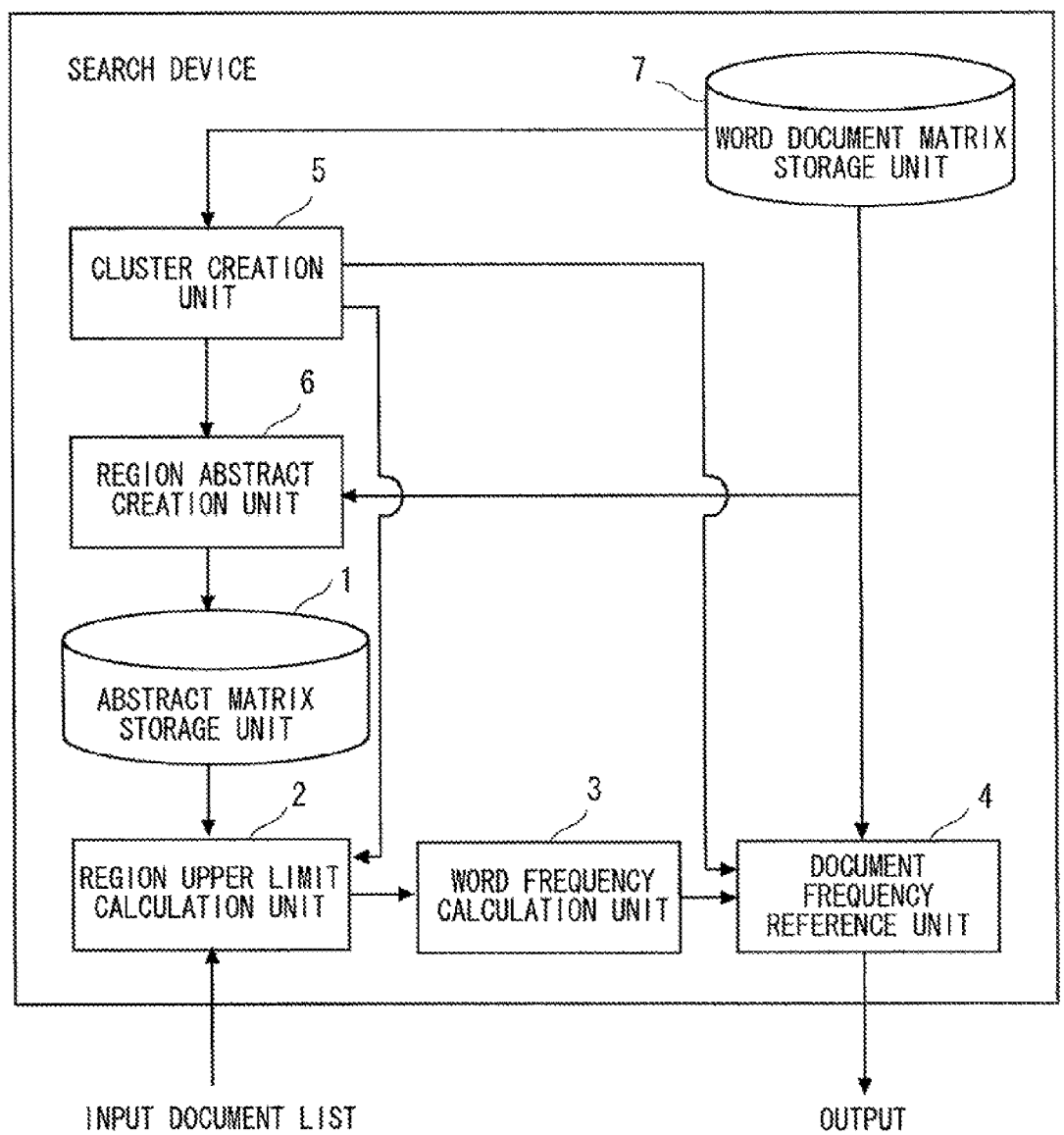
FIG. 4 is a block diagram showing a configuration of the search device according to a first exemplary embodiment of the present invention.

Hereinafter, a search device, a search method, and a program according to a first exemplary embodiment of the present invention are described with reference to FIGS. 4 to 24. Firstly, a configuration of the search device in the first exemplary embodiment is explained using FIGS. 4 to 12. FIG. 4 is a block diagram showing a configuration of the search device according to the first exemplary embodiment of the present invention.

As shown in FIG. 4, the search device in the first exemplary embodiment includes an abstract matrix storage unit 1, a region upper limit calculation unit 2, a word frequency calculation unit 3, and a document frequency reference unit 4, and searches for a word characteristic to the subset from the document set by these.

The abstract matrix storage unit 1 stores abstract information. The abstract information is created from a plurality of regions obtained by dividing the matrix representing the co-occurrence relationship between a word set Wall and the document set Dall. Further, the abstract information is information which enables calculation or estimation of a frequency of a word in each of the plurality of regions, when the information representing a subset D included in the document set Dall is provided.

When the information representing the subset D included in the document set Dall is input, the region upper limit calculation unit 2 examines a relationship between the information representing the subset D in the document set Dall and the plurality of regions. Then, the region upper limit calculation unit 2 refers to the abstract information for each of the plurality of regions from the obtained result, and calculates the upper limit of frequency for the subset D for the word included in each of them.

The word frequency calculation unit 3 adds the upper limit of the frequency for each of the plurality of regions by each region with a common word, and sets the obtained added value as the upper limit of the frequency of the word for each region with the common word. The document frequency reference unit 4 obtains the region to be searched according to the upper limit of the frequency of the word for each region with the common word. Then, the document frequency reference unit 4 identifies the specified number of words in order of high frequency according to the obtained region to be searched, and outputs the identified word to the subset D as a characteristic word.

Note that as the matrix representing the co-occurrence relationship, there is the word document matrix shown in FIG. 2. As each region, there is the region C[i][j] shown in FIG. 3. As the region with the common word, there is the abovementioned "word region". The "frequency" in the document set of the word is the number of the documents including the word in this document set, as mentioned above. Further, as information indicating the subset D included in the document set Dall, there is the input document list mentioned above.

As described above, the search device of the first exemplary embodiment evaluates the upper limit of the frequency of the word included in each region using the input document list and the abstract information created for each region in the word document matrix at the time of searching. Moreover, the search device determines the region to be searched, that is, the region of the word to read by organizing the upper limit of frequency by each word region. Therefore, according to the search device of the first exemplary embodiment, the reading process to an unnecessary word region can be avoided, and improvement in the speed of search can be achieved.

Here, the search device of the first exemplary embodiment is described further in detail. As shown in FIG. 1, in the first exemplary embodiment, the search device further includes a cluster creation unit 5, a region abstract creation unit 6, and a word document matrix storage unit 7.

The word document matrix storage unit 7 is a database including a list of words extracted from the document set Dall, and an arbitrary data structure that holds the word document matrix or information semantically equivalent to this. FIG. 5A is a view showing an example of the data structure stored to the word document matrix storage unit shown in FIG. 1. The data structure called an inverted index is shown in FIG. 5B. The inverted index includes a word table and a word index. The word table is a table in which a word and an identifier (a word number added to each word) for identifying the word are specified together with a corresponding word. The word index is an index in which the document number of the document including the word specified by the word number is specified with the word number as a key.

The cluster creation unit 5 inputs the word document matrix (the word table and the word index in FIGS. 5A and 5B in the first exemplary embodiment) stored to the word document matrix storage unit 7, and executes the two-dimensional clustering process to the documents and the words. By this clustering process, a set of documents in the word document matrix is divided into a plurality of document regions, and a set of words in the word document matrix is divided into a plurality of word regions.

Further, after the two-dimensional clustering process ends, the cluster creation unit 5 outputs the identifier (document region number) representing the document region including each document to the region upper limit calculation unit 2 and the region abstract creation unit 6. Furthermore, the cluster creation unit 5 outputs the identifier (word region number) representing the word region including each word to the document frequency reference unit 4 and the region abstract creation unit 6.

The two-dimensional clustering process by the cluster creation unit 5 is performed by receiving at least the word document matrix as an input, based on the co-occurrence information of the words and documents in this word document matrix. Further, in the first exemplary embodiment, the clustering process which divides a set of words into a plurality of word regions, and a clustering process which divides a set of documents into a plurality of document regions are performed. By such a two-dimensional clustering process, a sequence of identifiers (word region number) which means which word region a word enters for each word, and a sequence of identifiers (document region number) which means which document region a document enters for each document, are output.

Note that the "clustering process" is a process to divide a set of certain objects into a plurality of subsets (referred to as a "cluster"). In the clustering process, clusters are generated so that similar objects enter the same cluster, and different objects enter different clusters.

FIGS. 6A and 6B are views showing an example of the output by the cluster creation unit 5 shown in FIG. 1, FIG. 6A shows a word region list, and FIG. 6B shows a document region list. The word region list shown in FIG. 6A is a table representing a relationship between each word number and the word region number. This indicates by the word region number that which word region the word specified by the word number enters. For example, a word number "2" of the second row means the word "gasoline" (see FIG. 5A), and means that the word "gasoline" enters the word region "1", which is DC[1].

Further, the document region list shown in FIG. 6B is a table showing a relationship between each document number and the document region number. This indicates by the document region number that which document region the document specified by the document number enters.

Additionally, in the first exemplary embodiment, specifically the cluster creation unit 5 can be provided with one of the following devices which realizes the two-dimensional clustering process. As the clustering device which realizes the two-dimensional clustering process, there is a co-clustering device (see related art 1) based on the information theory, a clustering device (see related art 2) using Non-Negative Matrix Factorization (hereinafter referred to as "NMF"), and a clustering device (see related art 3) using PLSA.

[Related art 1] I. S. Dhillon, S. Mallela and D. S. Modha "Information-theoretic co-clustering", In Proceedings of ACM SIGKDD International Conference on pages 89-98, 2003.

[Related art 2] W. Xu, X. Liu and Y. Gong "Document clustering based on non-negative matrix factorization", In Proceedings of ACM SIGIR International Conference on pages 267-273, 2003.

[Related art 3] T. Hofmann "Probabilistic Latent Semantic Analysis", In Proceedings of Conference on Uncertainty in Artificial Intelligence on pages 289-296, 1999.

In addition to the word document matrix, the abovementioned "co-clustering device based on the information theory" further inputs the number of word regions to create, and the number of document regions to create. The clustering process by this device categorizes the words and the documents so as to minimize a difference of mutual information between the words and the documents before performing the clustering process, and mutual information between the words and the documents after performing the clustering process. By this characteristic, when dividing the word document matrix between the word region and the document region, a high-density region with high correlation and including many 1, and a low-density region with low correlation and including many 0 (zero) are generated.

Figure 7A:
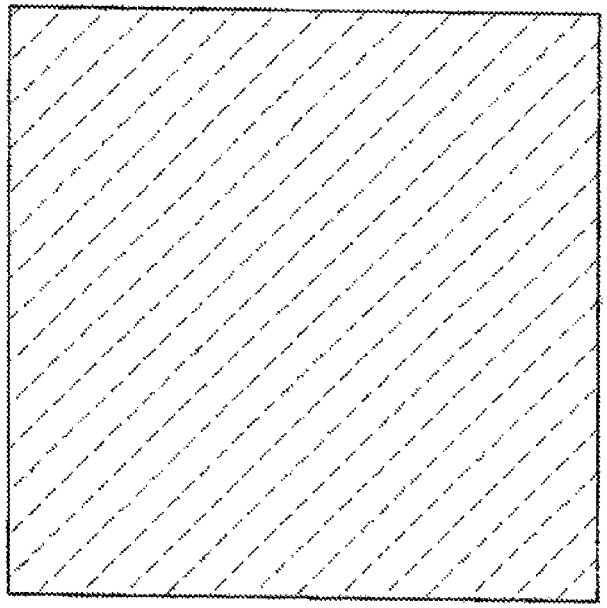
FIG. 7A is a view showing a state of the word document matrix before clustering for explaining a two-dimensional clustering process by a co-clustering device based on an information theory.
Figure 7B:
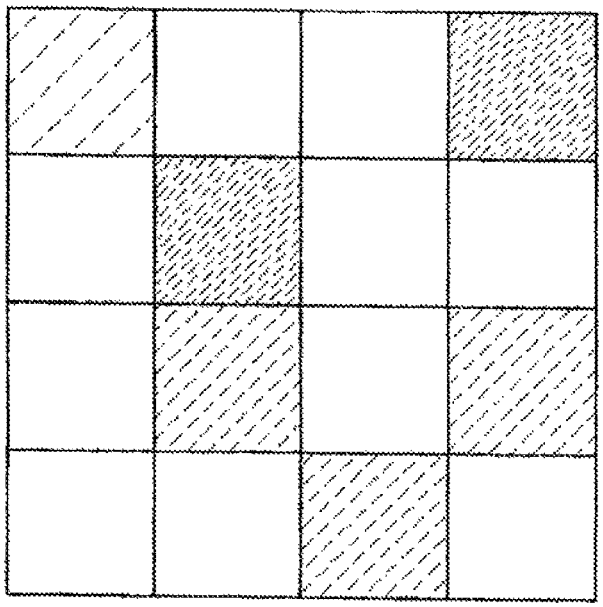
FIG. 7B is a view showing a state of the word document matrix before clustering for explaining a two-dimensional clustering process by a co-clustering device based on the information theory.

The result of the process by the co-clustering device based on the information theory is more intuitively explained using FIGS. 7A and 7B. FIGS. 7A and 7B are views for explaining the two-dimensional clustering process by the co-clustering device based on the information theory, FIG. 7A shows the state of the word document matrix before clustering, and FIG. 7B shows the state of the word document matrix after clustering.

Note that in the example of FIG. 7A, the number of the word regions to create and the number of the document regions to create are respectively set to four. Additionally, the degree of shade in each region indicates the ratio that "1" is included. Moreover, in the word document matrix before clustering, the words and the documents are equally distributed, and the part to be "1" is equally distributed in the matrix.

The word document matrix after clustering shown in FIG. 7B is obtained by respectively rearranging the words and the documents in the word document matrix before clustering by each word region number and each document region number which is assigned by the clustering device. Further, the word document matrix after clustering includes the high-density region and the low-density region, and accordingly, if a certain document set is determined, it will be clear which word region the set of words with high correlation with the document set is included therein.

In the clustering device using "NMF", and in the clustering device using "PLSA", a clustering process is performed with the word document matrix and the number of clusters to create K as an input. These two clustering devices regard both of words and documents as a set of concepts, and categorizes each of the words and the documents into K concepts. Accordingly, when the cluster of the concept assigned to the word is regarded as a word region, the cluster of the concept assigned to the document is regarded as a document region, the process performed by these two clustering devices can also be regarded as the two-dimensional clustering.

Figure 8A:
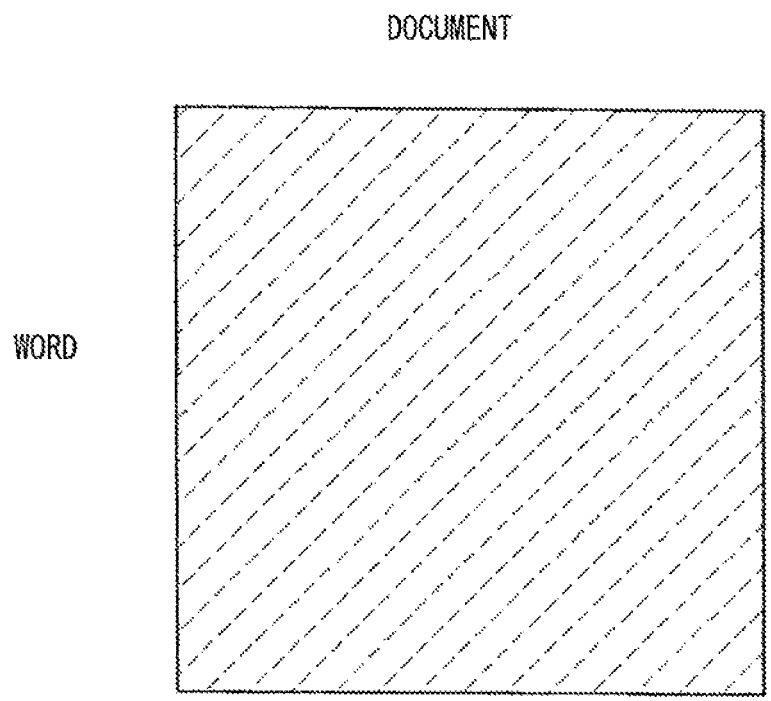
FIG. 8A is a view showing a state of the word document matrix before clustering for explaining a clustering process to diagonalize a word matrix.
Figure 8B:
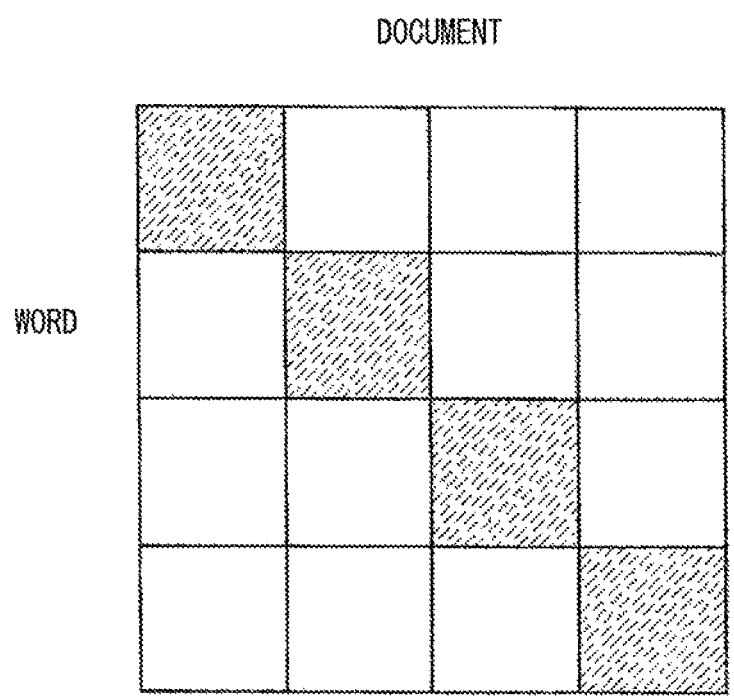
FIG. 8B is a view showing a state of the word document matrix after clustering for explaining the clustering process to diagonalize the word matrix.

Note that the clustering process performed by each clustering device mentioned above is purposed to divide the words and the documents into a cluster set with the same concept, and thus it is preferable to generate the set of regions so as to diagonalize the word document matrix. FIGS. 8A and 8B are used to explain this processing result more intuitively.

FIGS. 8A and 8B are views for explaining the clustering process to diagonalize the word matrix, in a similar way as FIGS. 7A and 7B, FIG. 8A shows the state of the word document matrix before clustering, and FIG. 8B shows the state of the word document matrix after clustering. Moreover, the degree of shade in each region indicates the ratio that "1" is included. In the clustering process to diagonalize the word matrix, in order for the word and the document to share the cluster to be categorized, the word document matrix is divided so as to be diagonalized (dark regions are diagonally aligned).

As described above, in the first exemplary embodiment, the process is performed so that the word and document with a similar concept may be organized in the same region, and an arbitrary process to divide the words and the documents is regarded as the two-dimensional clustering process.

The region abstract creation unit 6 creates the abstract information from the plurality of regions created in the division by the clustering process of the cluster creation unit 5, and stores this to the abstract matrix storage unit 1. In the first exemplary embodiment, the abstract information is information for calculating the upper limit of the dynamic region frequency of the word in each region when an input document list is provided, and is referred to as an abstract matrix. In the first exemplary embodiment, the region abstract creation unit 6 refers to the word index in the word document matrix storage unit 7 from the word region list and the document region list output from the cluster creation unit 5, and creates the abstract matrix. The region abstract creation unit 6 can create the abstract matrix shown in FIG. 9, or the abstract matrix shown in FIG. 10, for example.

FIG. 9 is a view showing an example of the abstract matrix in the first exemplary embodiment. In the example of FIG. 9, the maximum value of the static region frequency of the word in each region is specified as information for calculating the upper limit of the dynamic region frequency to each region of the word document matrix divided in 4×4.

As shown in. FIG. 9, for example, the first row of this abstract matrix is "48 , 1 , 0 , 7". This means that the word included in the word region WC[0] exists in maximum of 48 documents in the document region DC[0], maximum of one document in the document region DC[1], and maximum of zero document, that is, there is not a single document, in DC[2], and maximum of seven documents in the document region DC[3].

Further, FIG. 10 is a view showing another example of the abstract matrix in the first exemplary embodiment. In the example of FIG. 10, as the abstract information to calculate the upper limit of the dynamic region frequency, a bitstream indicating whether the word appears in the document in each region is specified, for each region of the word document matrix divided in 4×4.

As shown in FIG. 10, for the region C[0][0], for example, a bitstream of {1, 1, 1, . . . } is specified. This bitstream means that there is a possibility that the word in the word region WC[0] may appear in at least the first, second, third, and fourth documents in the document region DC[0]. Further, as for the region C [1][0], a bitstream of {0, 1, 0, 0. . . } is specified. This bitstream means that there is a possibility that the word in the word region WC[1] appears at least in the second document in the document region DC[0].

Here, a specific example of the region abstract creation unit 6 for creating the abstract matrix shown in FIG. 9 is explained. Especially, the region abstract creation unit 6 to create the abstract matrix shown in FIG. 9 is referred to as a "maximum value abstract creation unit". The maximum value abstract creation unit 6 obtains at least the frequency (static region frequency) in the region of the word included in each region for each of the plurality of regions generated by the division of the clustering process. Moreover, the maximum value abstract creation unit 6 specifies the maximum value of the obtained static region frequency. Specifically, the maximum value abstract creation unit 6 uses a word region list and a document region list that are input to the cluster creation unit 5. Further, the maximum value abstract creation unit 6 reads the section of the word document matrix corresponding to each region from the word document matrix storage unit 7, and calculates the maximum value (see FIG. 9) of the static region frequency of the word.

Then, a specific example of the region abstract creation unit 6 to create the abstract matrix shown in FIG. 10 is explained. Especially, the region abstract creation unit 6 to create the abstract matrix shown in FIG. 10 is referred to as a "vector abstract creation unit". For each of the plurality of regions generated by the division of the clustering process, the vector abstract creation unit 6 obtains at least a bitstream which indicates whether a word in the region is included in the document in each region. Specifically, the vector abstract creation unit 6 uses the word region list and the document region list that are input to the cluster creation unit 5. Further, the vector abstract creation unit 6 reads the section of the word document matrix corresponding to each region from the word document matrix storage unit 7, and examines whether each document in the region includes any of the words. Then, from the examination result, the vector abstract creation unit 6 creates a bitstream (see FIG. 10) of the same length as the number of documents in the region.

In this way, the abstract matrix created by the maximum value abstract creation unit and the vector abstract creation unit is stored to the abstract matrix storage unit 1. After that, it is used for a detection process by the region upper limit calculation unit 2, the word frequency calculation unit 3, and the document frequency reference unit 4.

In the first exemplary embodiment, when at least the input document list is input to the search device from an input device in which a user operates or an external module, the region upper limit calculation unit 2 is called. Then, the region upper limit calculation unit 2 refers to the input document list, the document region list passed from the cluster creation unit 5, and the information in the abstract matrix, and calculates the upper limit of the dynamic region frequency of the word included in each region of the word document matrix. Moreover, the region upper limit calculation unit 2 generates a region upper limit matrix from the calculated upper limit, and outputs this and the word region list to the word frequency calculation unit 3.

At this time, the "region upper limit matrix" is obtained by matrixing the upper limit value of the dynamic region frequency in each region in the word document matrix. FIG. 11 is a view showing an example of the region upper limit matrix in the first exemplary embodiment. In the example of FIG. 11, the value in the of the region C[0][0] is "19", for example. This means that the word included in the word region WC[0] appears only 19 times in the document set of the document region [0] in the input document list.

Specifically, firstly the region upper limit calculation unit 2 performs comparison between the input document list and the document region list (FIG. 6B), and examines which document region each of document in the input document list enters. Then, for each document region, the region upper limit calculation unit 2 counts the number of the documents in the input document list (number of document input) included in the region. Next, for each region, the region upper limit calculation unit 2 refers to the abstract matrix shown in FIG. 9, and calculates the maximum value of the static region frequency of the word in each region. Then, for each region, the region upper limit calculation unit 2 compares the maximum value of the static region frequency and the number of document input, and calculates the smaller one as the upper limit.

Alternatively, the region upper limit calculation unit 2 may perform comparison between the input document list and the document region list, and after examining which document region each of the document in the input document list enters, may create a bitstream (input bitstream) indicating whether the document in the input document list is included or not. In this case, for each region, the region upper limit calculation unit 2 refers to the abstract matrix shown in FIG. 10, performs an AND operation to the created bitstream and the bitstream of the abstract matrix, and calculates the number of "1" of the bitstream consequently obtained as the upper limit.

In the first exemplary embodiment, the word frequency calculation unit 3 adds the region upper limit matrix output by the region upper limit calculation unit 2 for each word region, and outputs the added value for word region as the word upper limit list. For example, if the region upper limit matrix shown in FIG. 11 is input and this is added in the horizontal direction (for each word region), the word upper limit list shown in FIG. 12 is obtained. FIG. 12 is a view showing an example of the word upper limit list in the first exemplary embodiment.

In this way, the word maximum list is obtained by calculating the upper limit value of the dynamic region frequency for each word region from the document region list and the input document list. The word upper limit list shown in FIG. 12 indicates the upper limit of the dynamic region frequency for each word region calculated for a certain input document list. Specifically, in FIG. 12, for example in the word region WC[0], the upper limit is "27". This means that the word in the word region WC[0] appears only 27 times in the input document.

In the first exemplary embodiment, when the word upper limit list output by the word frequency calculation unit 3 and the word region list output by the cluster creation unit 5 are input, the document frequency reference unit 4 narrows down the word region according to the word upper limit list. Further, the document frequency reference unit 4 refers to the word in each word region and its document list according to the word region list, specifies the top k words with high frequency (document frequency), and outputs this. Note that the document frequency reference unit 4 is a means to refer to the word in a certain word region and its document list, and in the first exemplary embodiment, other means may be used as the document frequency reference unit 4.

Next, the search method in the first exemplary embodiment of the present invention is explained using FIGS. 13 to 24. The search method in the first exemplary embodiment is performed by operating the search device in the first exemplary embodiment shown in FIG. 4. Therefore, in the following explanation, the operation of the search device in the first exemplary embodiment is also explained with reference to FIGS. 4 to 12 as appropriate.

Furthermore, in the search method according to the first exemplary embodiment, two processes of a clustering process P10 and a search process P20 are mainly executed. Among these, the clustering process is performed by the cluster creation unit 5 and the region abstract creation unit 6. The search process P20 is performed by the region upper limit calculation unit 2, the word frequency calculation unit 3, and the document frequency reference unit 4. In the first exemplary embodiment, the clustering process P10 and the search process P20 may be continuously performed or separately performed. Hereinafter, these are explained in order.

Figure 13:
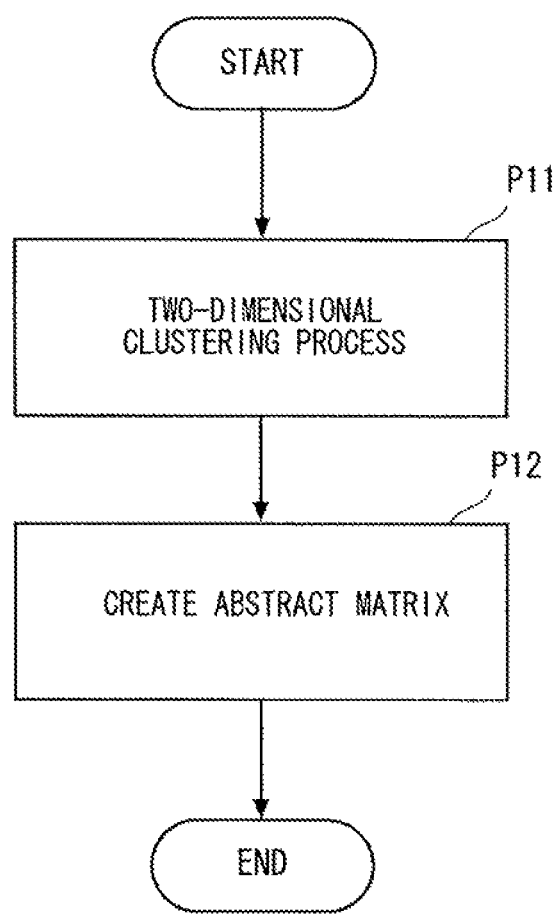
FIG. 13 is a flowchart showing processes in a clustering process performed in a search method according to the first exemplary embodiment of the present invention.

First, the clustering process P10 is explained using FIG. 13. FIG. 13 is a flowchart showing processes in the clustering process performed by the search method of the first exemplary embodiment of the present invention. The clustering process P10 is started by an administrator (user) of the search device or an external module.

As shown in FIG. 13, when the clustering process P10 is started, firstly the cluster creation unit 5 reads the word document matrix stored to the word document matrix storage unit 7, and performs the two-dimensional clustering process (step P11). Then, the word region list (see FIG. 6A) and the document region list (see FIG. 6B) are output to the region abstract creation unit 6. Furthermore, at least the document region list is output to the region upper limit calculation unit 2 at least. In the step P11, the cluster creation unit 5 may output the word region list to the document frequency reference unit 4.

Next, the region abstract creation unit 6 uses the word region list and the document region list which are passed from the cluster creation unit 5. Then, the region abstract creation unit 6 refers to the word document matrix storage unit 7, creates the abstract matrix (see FIG. 9 or 10) for each region, and stores this to the abstract matrix storage unit 1 (step P12). The clustering process P10 ends after execution of the step P12.

Figure 14:
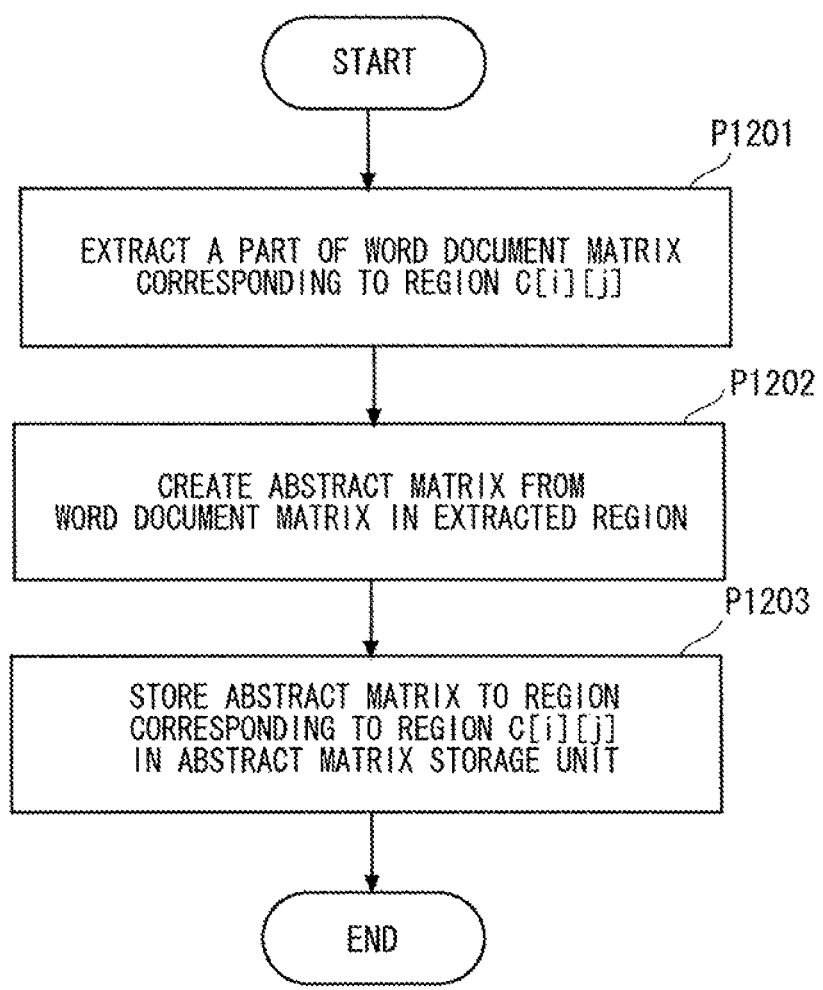
FIG. 14 is a flowchart specifically showing a step P12 shown in FIG. 13.

Here, the step P12 is explained in more detail using FIG. 14. FIG. 14 is a flowchart showing the step P12 shown in FIG. 13 in detail. As shown in FIG. 14, in the step P12, for each of the region C[i][j]($0 \leq i < m$, $0 \leq j < n$) created according to the input word region list and the document region list, the following steps P1201 to P1203 are executed.

First, the region abstract creation unit 6 extracts only the section of the word document matrix corresponding to the region C[i][j] from the word document matrix storage unit 7 (step P1201). Next, the region abstract creation unit 6 creates the abstract matrix (abstract information) for the section extracted in the step P1201 (step P1202). Then, the region abstract creation unit 6 stores the abstract matrix created in P1202 to the region corresponding to the region C[i][j] in the abstract matrix storage unit 1 (P1203).

Figure 15:
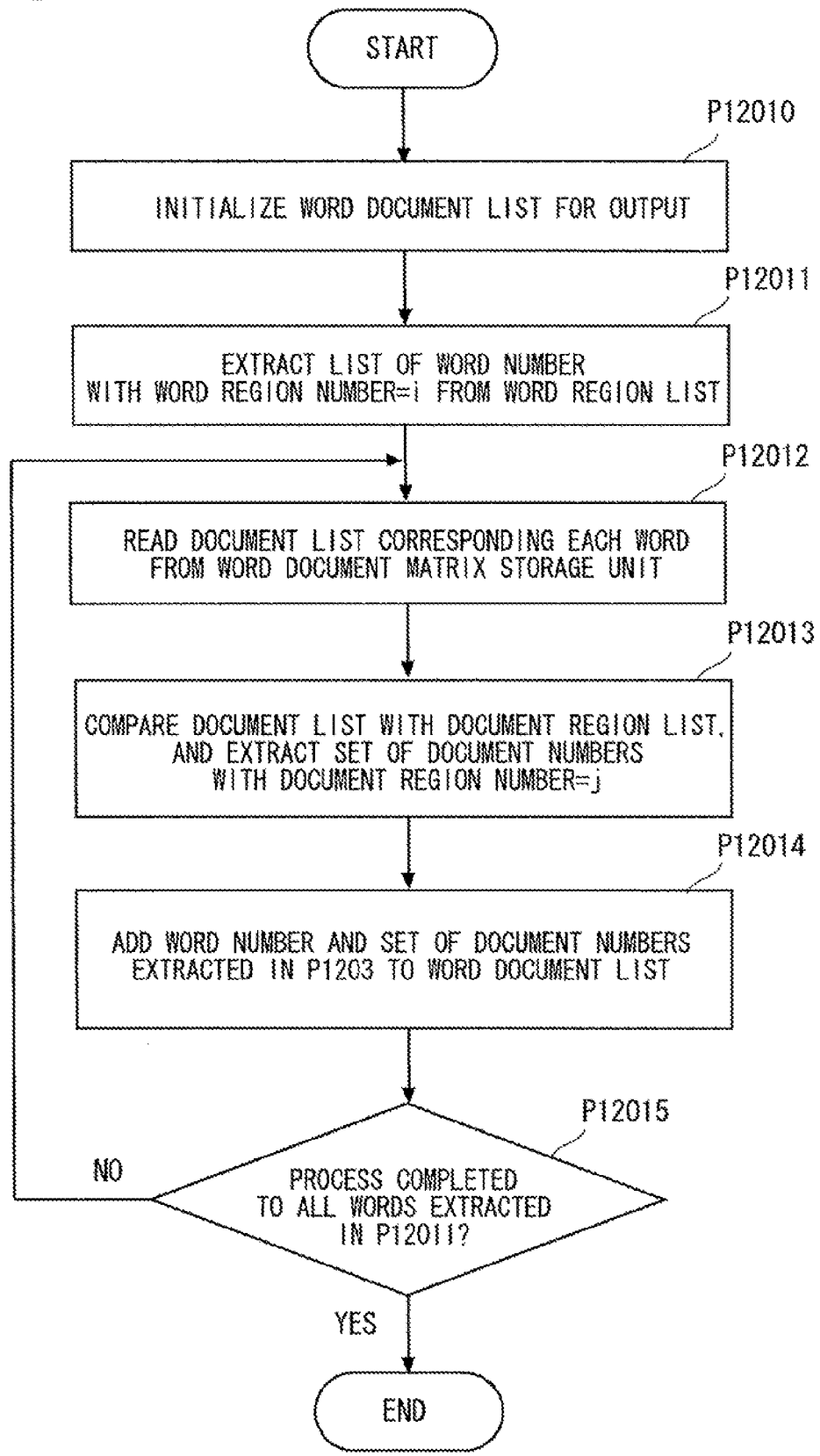
FIG. 15 is a flowchart showing a step P1201 shown in FIG. 14 in detail.

Furthermore, the step P1201 shown in FIG. 14 is explained in further detail using FIG. 15. FIG. 15 is a flowchart showing the step P1201 shown in FIG. 14 in detail. The step P1201 is a process to output the section of the word document matrix corresponding to the region C[i][j] as the word document list by inputting a word region number i and a document region number j, and referring to the word document matrix storage unit 7.

As shown in FIG. 15, firstly the region abstract creation unit 6 creates the word document list for output in an empty state (P12010). In other words, the region abstract creation unit 6 initializes the word list for output.

Next, the region abstract creation unit 6 extracts the list of word numbers where a word region number is equal to i from the word region list (step P12011). Subsequently, the region abstract creation unit 6 perform the processes of the following steps P12012 to P12015 for each word number s in the extracted list of word numbers.

Specifically, the region abstract creation unit 6 refers to the word index in the word document matrix storage unit 7 and reads the document list for each word (step P12012). Next, the region abstract creation unit 6 compares the document list and the document region list which are read in the step P12012, and extracts a set of document numbers where the document region number=j (P12013). Next, the region abstract creation unit 6 adds the word number s and the set of the document numbers extracted in P12013 to the word document list (step P12014).

After that, the region abstract creation unit 6 evaluates whether the process has ended to all the words extracted in the step P12011 (step P12015). If it has not ended as a result of evaluation, the region abstract creation unit 6 executes the steps P12012 to P12014 again. On the other hand, if it has ended, the region abstract creation unit 6 ends the process.

Figures 16, 17:
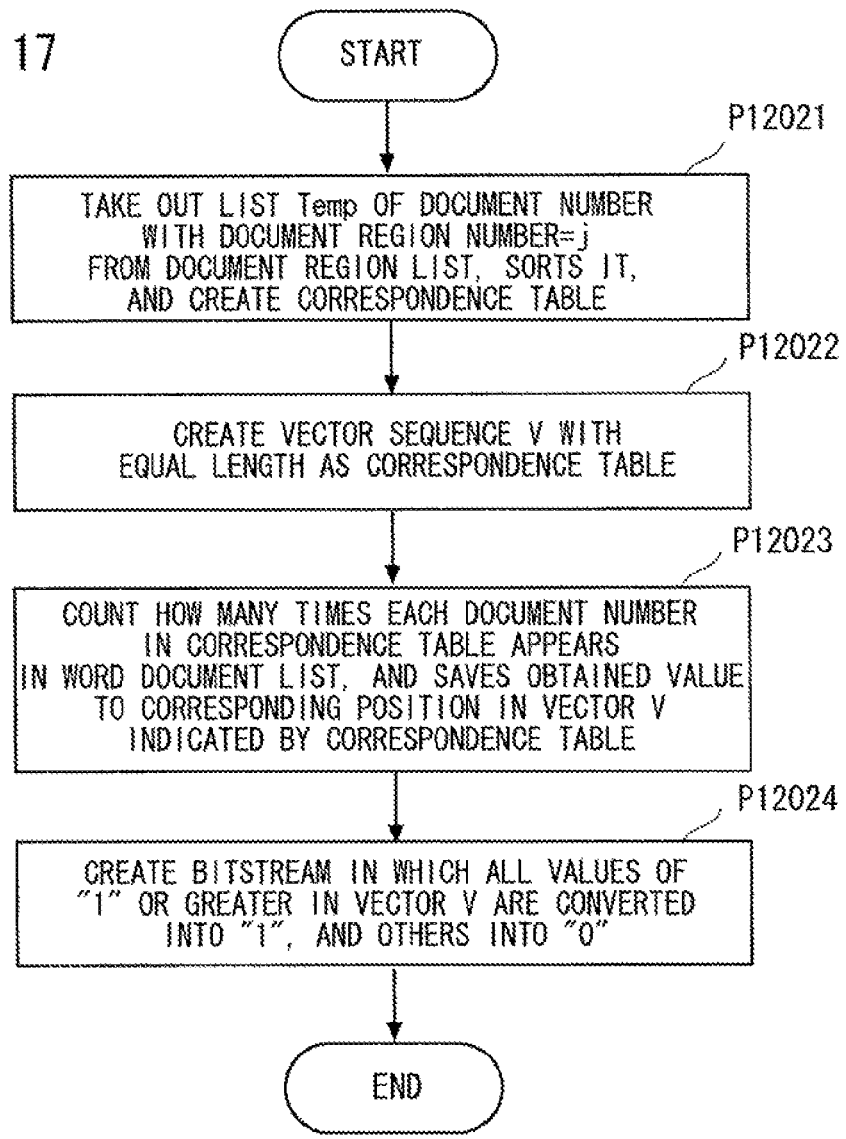
FIG. 16 is a view showing an example of the word document list.
FIG. 17 is a flowchart showing a step P1202 shown in FIG. 14 in detail.

Note that the "word document list" is information composed of a list of the word numbers of the words in the region C[i][j] and the document numbers of the documents in the region C[i][j] in which the words appear. FIG. 16 is a view showing an example of the word document list. In the example of FIG. 16, it is assumed that the words of the word numbers 1, 3, and 5 are included in the word region WC[0], and the documents of the document numbers 1, 2, 3, and 4 are included in the document region DC[0], and a word document list created for the region C[0][0] is shown.

Further, the step P1202 shown in FIG. 14 is explained in detail. First, the case in which the region abstract creation unit 6 functions as the maximum value abstract creation unit is explained. In this case, in the step P1202, the maximum value abstract creation unit examines the document list in region for each word document based on the word document list output in P1201, calculates the number of document numbers (which is, the static region frequency) included in the document list in region, and outputs its maximum value.

Next, the case in which the region abstract creation unit 6 functions as the vector abstract creation unit is explained. FIG. 17 is a flowchart showing the step P1202 shown in FIG.

14 in detail. In P1202 shown in FIG. 17, the vector abstract creation unit performs the steps from P12021 to P12024 for each region C[i][j], and outputs a created bitstream B.

Note that this bitstream B created for each of the region C[i][j] has a following meaning. Each element in the bitstream B corresponds to each document in the region C[i][j], and the value of each element means whether there is a possibility that the document holds one or more words in the region C[i][j] ("1") or not ("0").

Each step of P12021 to P12024 is explained. First, the vector abstract creation unit (region abstract creation unit 6) takes out a list Temp of the document numbers, where the document region number=j, from the document region list. Further, the vector abstract creation unit sorts the document numbers in the list Temp, and thereby creates a correspondence table (step P12021). The correspondence table is a table indicating that what position in the document region DC[j] each document in the document region DC[i]is in.

FIG. 18 is a view showing an example of the correspondence table created by the abstract creation unit. As shown in FIG. 18, it indicates that the'document with the document number "1" for example is a first element. Further, it can be seen that the document with the document number "10" is a fifth element.

Next, the vector abstract creation unit creates a vector V with the same length as the correspondence table and all elements are "0(zero)". Moreover, if the position of each document number q in the correspondence table is "r", after counting how many times the document number q appears in the word document list, the vector abstract creation unit saves the counted value to "r"th in the vector V (P12023). Accordingly, the vector V will be a vector indicating how many times "1" appears for each document in the region C[i][j].

Lastly, the vector abstract creation unit creates a bitstream B in which all values of "1" or greater in the vector V are converted into "1" and others into "0(zero)" (step P12024), and ends the process. Note that in the step P12024, although the process is performed in which "all values of 1 or greater are converted into "1" and others into "0"" for the vector V, the following step P12024 may be performed instead.

In the step P12024', all the values of a threshold a or greater among the values included in the vector V are converted into "1", others are converted into "0", and the bitstream is created. Note that the threshold $\alpha$ shall be configured beforehand by an administrator of the search device. The value of each element of the bitstream created in the step P12024' indicates whether there is a high possibility that the document includes the word in the region C[i][j] ("1") or not ("0").

Figure 19:
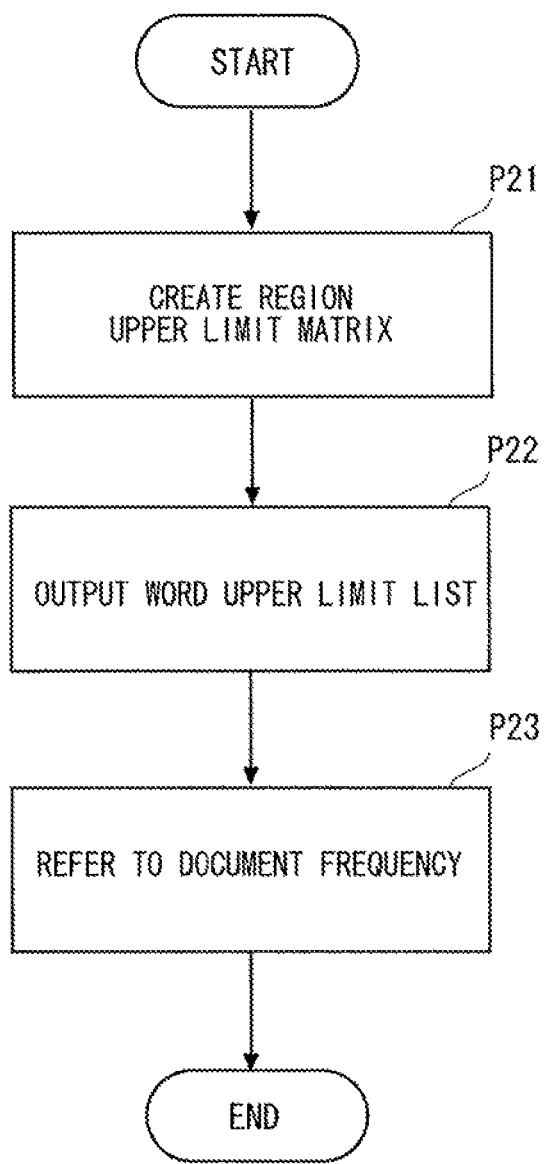
FIG. 19 is a flowchart showing processes in a search process performed in the search method according to the first exemplary embodiment of the present invention.

Next, the search process P20 is explained using FIG. 19. FIG. 19 is a flowchart showing the process in the search process performed by the search method of the first exemplary embodiment of the present invention. The search process P20 is started when a user or an external program (module) inputs the input document list into the region upper limit calculation unit 2.

If the search process P20 is started, firstly the region upper limit calculation unit 2 calculates the upper limit of the dynamic region frequency for each region, and outputs the region upper limit matrix (step P21). Next, the word frequency calculation unit 3 adds the region upper limit matrix in the word region direction, and outputs the word upper limit list (step P22).

Lastly, the document frequency reference unit 4 inputs the word upper limit list and refers to the word document matrix storage unit 7. Further, the document frequency reference unit 4 refers to the document list while narrowing down the word region, and outputs top k words with higher frequency to the input document list (step P23). Specifically in the step P23, the document frequency calculation unit 4 specifies the characteristic words in the input document while referring to the frequency (document frequency) of each word. The process in the search process P20 ends after execution of the step P23.

Figure 20:
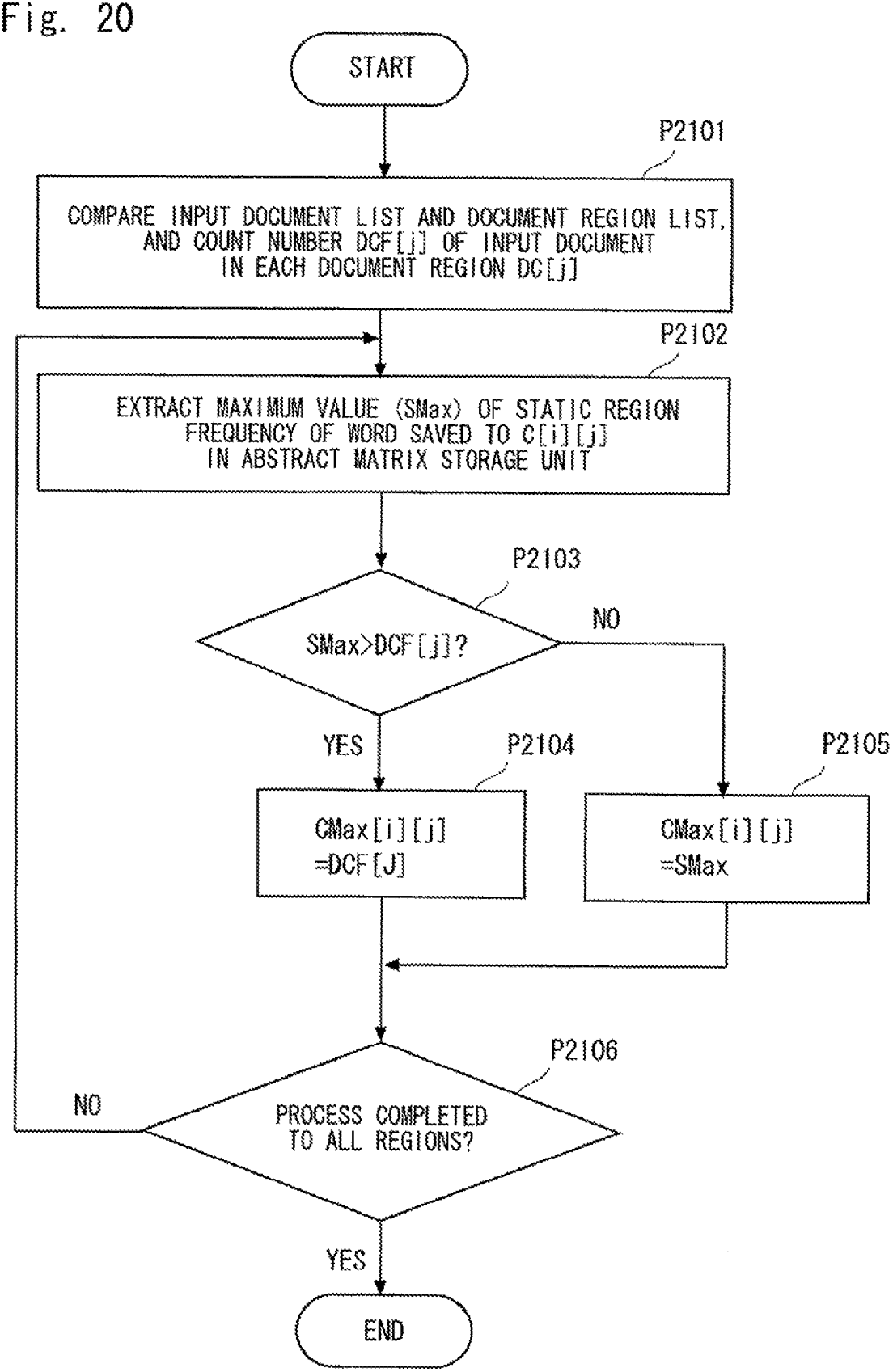
FIG. 20 is a flowchart showing an example of a specific example of a step P21 shown in FIG. 19.

Next, each of the steps P21 to P23 is explained in detail using FIGS. 20 to 24. Firstly, the step P21 is explained using FIGS. 20 and 21. The step P21 is a process in which the region upper limit calculation unit 2 inputs the input document list and outputs a region upper limit matrix CMax[i][j]{0<=i<m, 0<=j<n}. As an example of this process, the process (P210) executed by the region upper limit calculation unit 2 which refers to the abstract matrix shown in FIG. 9 is explained using FIG. 20. FIG. 20 is a flowchart showing an example of a specific example of the step P21 shown in FIG. 19.

As shown in FIG. 20, firstly the region upper limit calculation unit 2 examines the document region list output by the cluster creation unit 5 based on the document number in the input document list, and counts how many documents are included in each document region DC[j] (step P2101). Note that this output (counted value) is defined as DCF[j] {0<=j<n}. DCF[j] means the number of the documents included in the document region DC[j] among the documents in the input document list.

Next, for each region of the word document matrix, the region upper limit calculation unit 2 refers to the abstract matrix storage unit 1, and executes the steps P2102 to P2105. Specifically, for each region C[i][j]{0<=i<m and 0<=j<n}, the region upper limit calculation unit 2 refers to the abstract matrix storage unit 1, and extracts the maximum value of the static region frequency of the word (P2102). Note that the maximum value of the static region frequency of the word to this region C[i][j] shall be sMax.

The region upper limit calculation unit 2 compares the magnitude relation of sMax and DCF[j] (P2103). If sMax>DCF[j] is satisfied as a result of the comparison, the region upper limit calculation unit 2 substitutes DCF[j] into CMax[i][j] (P2104). This is because that if there is only DCF[j] documents of the region C[i][j] in the input document list, there should be no word that appears more than DCF[j] in the region.

On the other hand, if sMax>DCF[j] is not satisfied as a result of the comparison, sMax is substituted into CMax[i][j] (P2105). This is because that if the static region frequency of the word in the region C[i][j] is only sMax, there should be no word that appears sMax or more exists in the region.

Then, the region upper limit calculation unit 2 evaluates whether the process of the steps P2102 to P2105 has ended for all the regions (step P2106). If it is not ended as a result of the evaluation, the region upper limit calculation unit 2 executes the steps P2102 to P2105 again, and if it is ended, the process ends.

Figure 21:
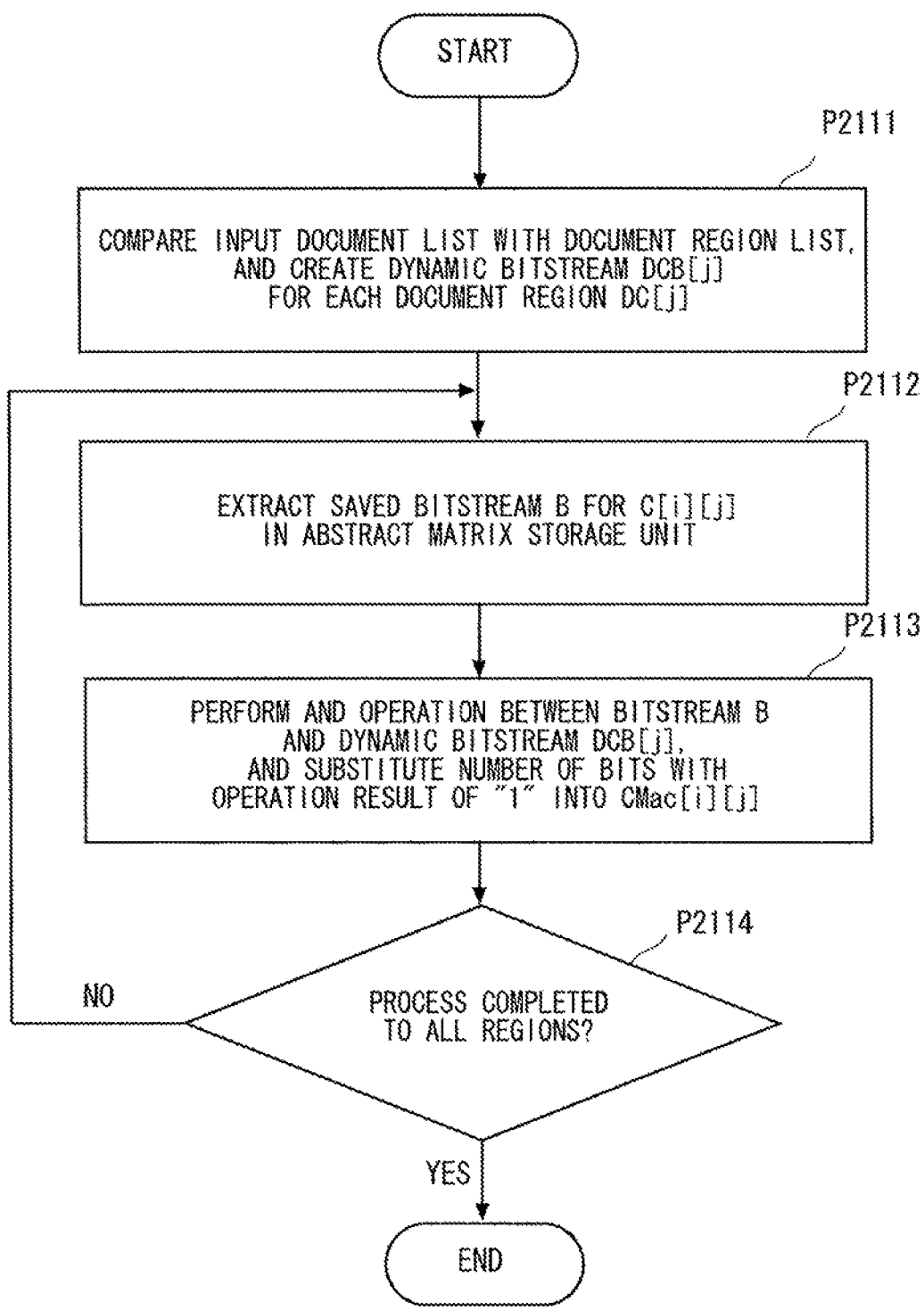
FIG. 21 is a flowchart showing another example of the example of the step P21 shown in FIG. 19.

Further, as another example of the step P21, the process (P211) executed by the region upper limit calculation unit 2 which refers to the abstract matrix shown in FIG. 10 is explained using FIG. 21. FIG. 21 is a flowchart showing another example the step P21 shown in FIG. 19.

As shown in FIG. 21, firstly the region upper limit calculation unit 2 examines the document region list output by the cluster creation unit 5 according to the document number in then input document list, and creates n bitstreams for each document region DC[j] (P2111). These n bitstreams are defined as a dynamic bitstream DCB[j]{0<=j<n}.

The dynamic bitstream DCB[j] takes the number of documents included in the document region DC[j] as the length, and each element represents a binary of whether there is a possibility that each document in the document region DC[j] is included in the input document list ("1") or not ("0").

Next, the region upper limit calculation unit 2 executes processes P2112 to P2113 to each region C[i][j]. Specifically, for each region C[i][j]{0<=i<m and 0<=j<n}, the region upper limit calculation unit 2 refers to the abstract matrix storage unit 1, and extracts the bitstream B stored to the abstract matrix storage unit 1 (step P2112).

Next, the region upper limit calculation unit 2 performs an AND operation of the two bitstreams, which are the bitstream B and the dynamic bitstream DCB[j], and substitutes the number of bits in which the result of the operation is "1" into CMax[i][j] (P2113). By this step, AND can be obtained, AND between a set of documents which have a possibility of including a word in the word region WC[i] indicated by the bitstream B and a set of documents included in the input document list indicated by DCB[j]. This means that the upper limit of the dynamic region frequency of the word in the target region is estimated.

After that, the region upper limit calculation unit 2 evaluates whether the process of the steps P2112 to P2113 for all the regions has end(step P2114). If it has not ended as a result of the evaluation, the region upper limit calculation unit 2 executes the steps P2112 to P2113 again, and if it has ended, the process ends.

Figure 22:
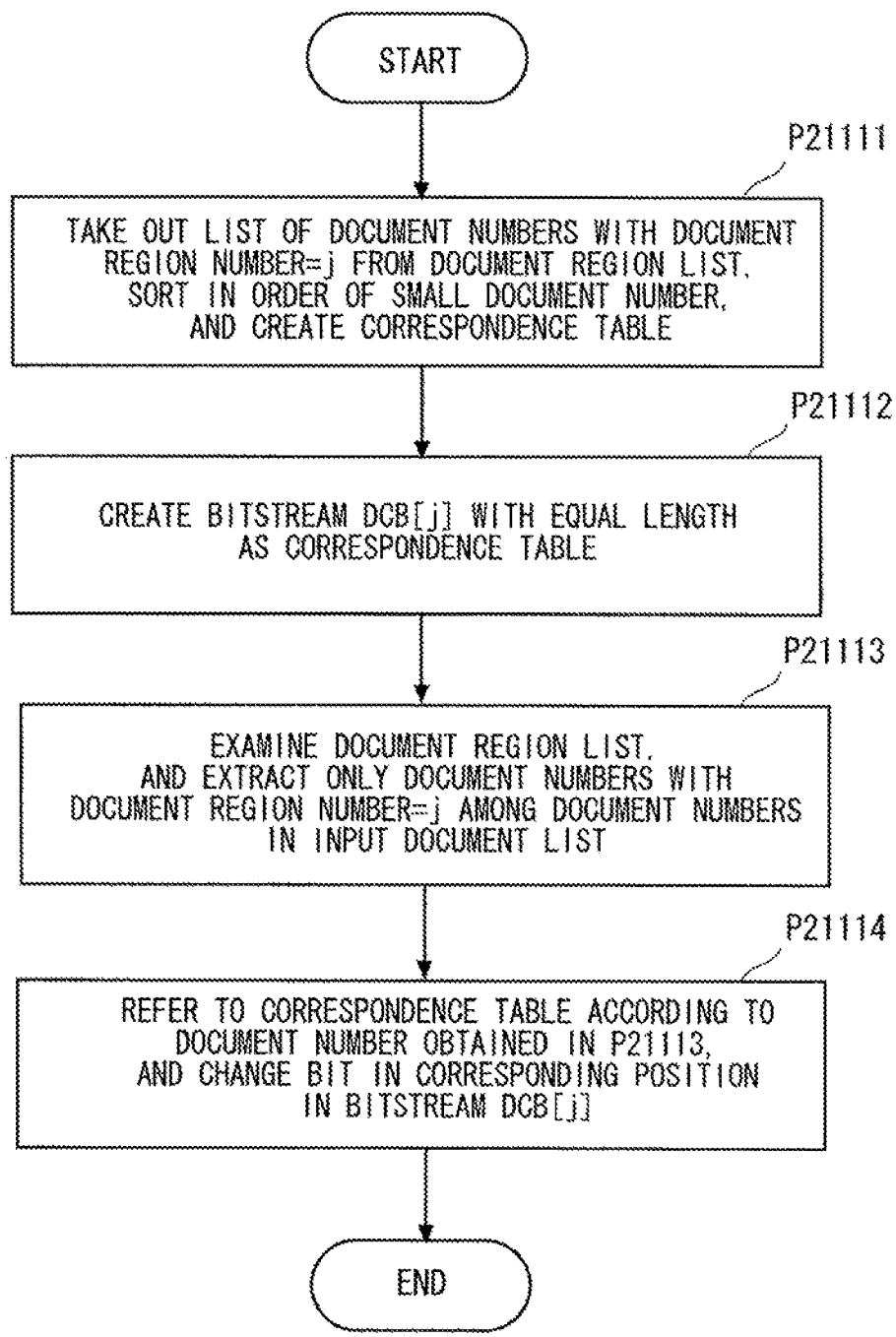
FIG. 22 is a flowchart showing a specific example of a step P2111 shown in FIG. 21.

Further, the process P2111 shown in FIG. 21 is explained in detail using FIG. 22. FIG. 22 is a flowchart showing a specific example of the step P2111 shown in FIG. 21. As described above, the step P2111 is a step in which the region upper limit calculation unit 2 inputs the input document list and the document region list, and outputs the dynamic bitstream DCB[j]{0<=j<n}. In this step, to each document region DC[j]{0<=j<n}, the region upper limit calculation unit 2 executes the process from P21111 to P21114, creates the bitstream DCB[j], and outputs this.

Specifically, as shown in FIG. 22, firstly the region upper limit calculation unit 2 takes out the list of document numbers where the document region number=j from the word region list. Moreover, the region upper limit calculation unit 2 sorts the document numbers in the list in ascending order, and thereby creates the correspondence table (step P21111). This correspondence table is the same correspondence table created for each region in the step P12021 shown in FIG. 17. Therefore, it may be a mode in which the correspondence table created beforehand by the vector abstract creation unit (region abstract creation unit 6) is held for every document region, and the region upper limit calculation unit 2 can use this.

Next, the region upper limit calculation unit 2 creates a bitstream DCB[j] with equal length as the correspondence table (step P21112). Furthermore, the region upper limit calculation unit 2 refers to each document number in the input document list, and extracts only the document number where the document region number=j (step P21113).

Lastly, according to each document number obtained in the step P21113, the region upper limit calculation unit 2 refers to the correspondence table, examines a position r, and changes the rth bit in the bitstream DCB[j] into "1" (step P21114). The process ends after execution of the step P21114. Note that in the step P21111 and the step P21112, the input document list is not needed for the process. Accordingly, before the search process P20 is called, these steps may be executed beforehand at any timing.

Next, the step P22 shown in FIG. 19 is explained in detail. As described above, the step P22 is a process in which the word frequency calculation unit 3 inputs the region upper limit matrix, and outputs the word upper limit list. When the region upper limit matrix is CMax[i][j]{0<=i<m, 0<=j<n}, and the word upper limit list is WMax[i]{0<=i<m}, the word frequency calculation unit 3 performs a calculation process expressed by the following formula (1). By the following formula (1), for each word region, the word frequency calculation unit 3 adds the frequency for each word region, calculates the upper limit of the document frequency for the input document list, and as a result, outputs it as the word upper limit list.

$$W\text{Max}[i] = \sum_{j=0}^{n} C\text{Max}[i][j] \qquad (1)$$

Figure 23:
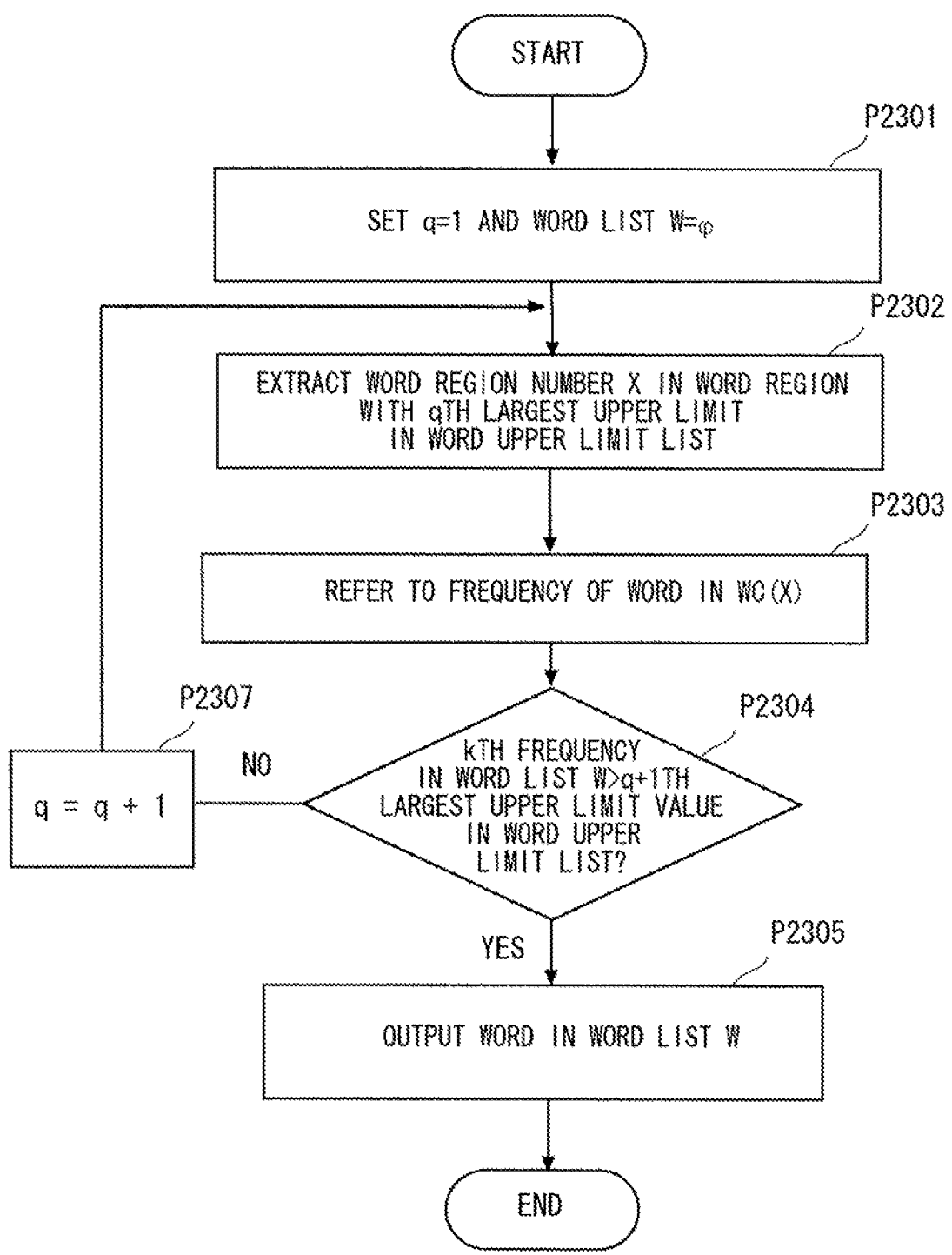
FIG. 23 is a flowchart showing a specific example of a step P23 shown in FIG. 10.

Next, the step P23 shown in FIG. 19 is explained in detail. As described above, the step P23 is a process in which the document frequency reference unit 4 inputs the word upper limit list, and calculates the top k words with high frequency for the input document list while narrowing down the word region. FIG. 23 is a flowchart showing a specific example of the step P23 shown in FIG. 19.

As shown in FIG. 23, firstly the document frequency reference unit 4 sets a variable q to 1, empties a word list W for output, and initializes it (step P2301). Note that the word list W is a list storing the top k words with high document frequency for the document set specified by the input document list and their frequencies (document frequencies).

Next, the document frequency reference unit 4 refers to the word upper limit list, and extracts a word region number X of a word region with a qth largest upper limit value (step P2302). Further, the document frequency reference unit 4 refers to the frequency (document frequency) of each word in a word region WC[X] according to the word region list obtained from the cluster creation unit 5 (step P2303).

Specifically, in the step P2303, the document frequency reference unit 4 obtains a list of word numbers in the word region WC[X] according to the word region list, and extracts the document list corresponding to each word number from the word index in the word document matrix. Then, the document frequency reference unit 4 examines the frequency (document frequency) to the input document list by comparing the extracted document list and the input document list, refers to the examined frequency, extracts the top k words with higher frequency, and updates the word list W (P2303).

Then, the document frequency reference unit 4 compares the frequency of the kth word in the word list W and the q+1th largest upper limit value among the upper limit of the word upper limit list, and examines the magnitude relation between both of them (P2304). As a result of the comparison, if the frequency of the kth word in the word list W is greater than the q+1th largest upper limit, the document frequency reference unit 4 outputs the word in the word list W to an external display device and an external program (P2305), and ends the process. This is because that in this case the word with a greater frequency than the current kth word will not be included in other word regions.

On the other hand, as a result of the comparison, if the frequency of the kth word in the word list W is smaller than the q+1th largest upper limit, the document frequency reference unit 4 adds one to q (P2307), and executes the step P2302 again.

Figure 24:
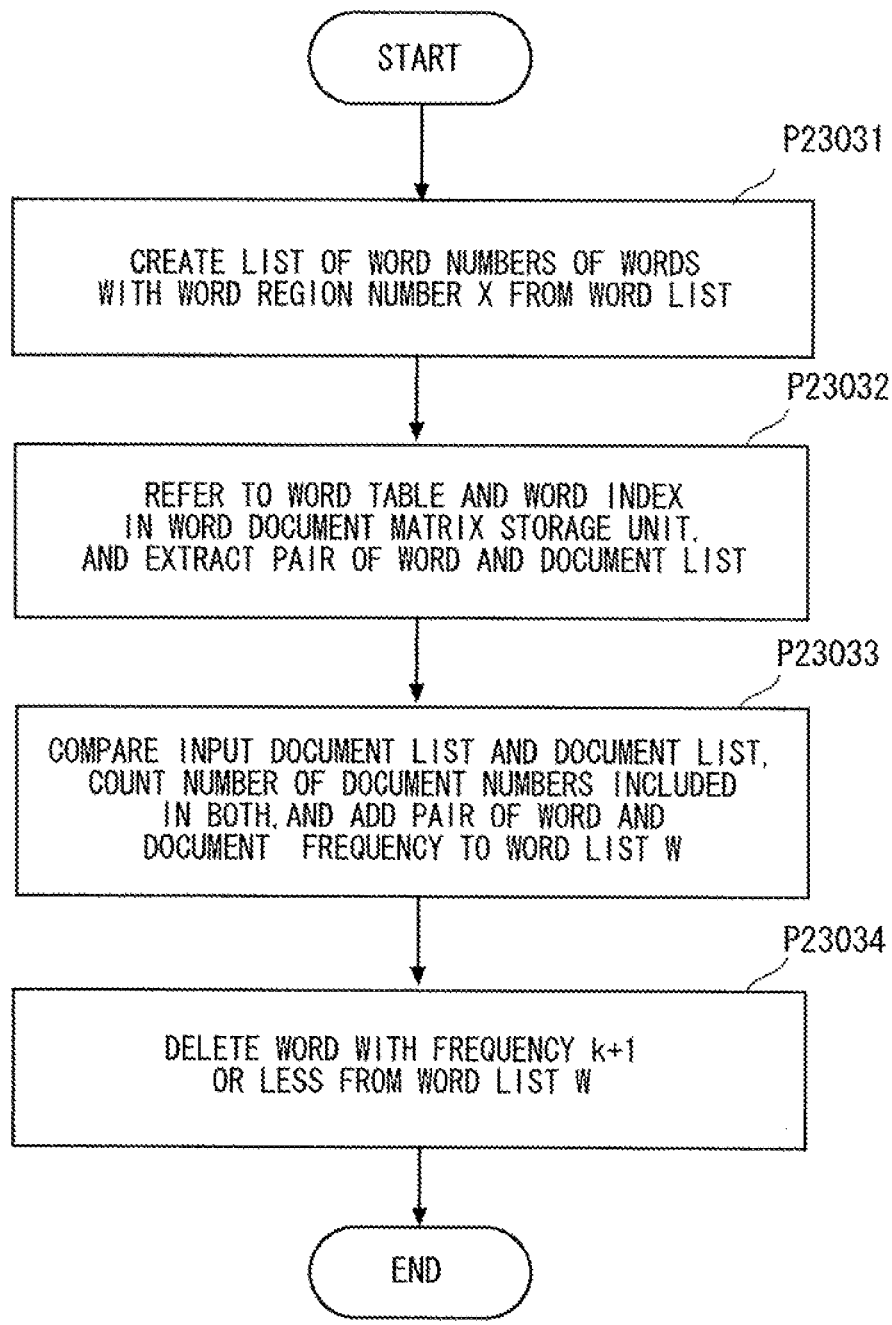
FIG. 24 is a flowchart specifically showing a step P2303 shown in FIG. 23.

Next, the step P2303 is explained in detail using FIG. 24. FIG. 24 is a flowchart showing the step P2303 shown in FIG. 23 in detail. In the step P2303, the word region number X will be an input. In P2303, firstly the document frequency reference unit 4 examines the word region list obtained from the cluster creation unit 5 based on the input word region number X, and creates a list of the word numbers of the words which enter the word region WC[X] (step P23031).

Next, for each of the word numbers obtained in the step P23031, the document frequency reference unit 4 refers to the word table in the word document matrix storage unit 7 and the word index, and extracts a pair of the word itself and the document list (step P23032).

Subsequently, the document frequency reference unit 4 compares the document list and the input document list using the pair of the word and the document list obtained in the step P23032, counts the number of document numbers included in both, creates a pair of the word and a document frequency, and adds this to the word list W (step P23033).

After that, the document frequency reference unit 4 sorts inside the word list W in descending order of the document frequency, and deletes the pair of the word and the document frequency with the frequency k+1th or less from the word list W (step P23034). When the step P23034 is executed, the process in the document frequency reference unit 4 ends.

Note that in the first exemplary embodiment, as mentioned above, in the step P2303, the word region list obtained from the cluster creation unit 5 is used, and a group of the word and the document list in the region is referred from the word region number. Therefore, the information in the word document matrix storage unit 7 is referred. However, the first exemplary embodiment is not limited to this, but it may be a mode in which the word region list is not used and other arbitrary data is referred.

Specifically, the data in the word document matrix storage unit 7 is divided beforehand into each word region which is created by the cluster creation unit 5. Then, an integrated data storage unit is prepared which can collectively reads the word and the document list in each word region using the word region number as a key. Then, in the process of the step P23, it may be a mode in which the integrated data storage unit may be referred to and the word and the document list in a certain word region is collectively read.

By performing the search method according to the first exemplary embodiment in this way, as described in the explanation of the search device, since the region to be searched, that is, the region of the word which should be read, is determined, a reading process to an unnecessary word region can be avoided, and thereby achieving higher speed of the search.

Further, in the first exemplary embodiment, since the two-dimensional clustering process is performed beforehand to the word document matrix, narrowing down at the time of search can be efficiently performed.

Furthermore, in the first exemplary embodiment, if the upper limit of static region frequency is calculated beforehand for each region, the region upper limit matrix can be created at a high speed. Accordingly, the region of the word which should be read at a high speed is determined, and also the reading process to an unnecessary word region is avoided, thus the search speed can be further improved.

Additionally, in the first exemplary embodiment, if the bitstream indicating whether each document in the region includes the word in the region or not for each region is stored to the abstract matrix storage unit 1, an AND operation of the bitstream and the input document list enables the region upper limit matrix to be created more precisely. Therefore, it is possible to narrow down more word regions, and since more unnecessary word regions can be narrowed down, it is possible to further speed up the search.

The program in the first exemplary embodiment of the present invention may be a program that causes a computer to execute each step shown in FIGS. 13 to 17, and FIGS. 19 to 24. By installing this program and executing this program, the search device of the first exemplary embodiment is realized, and it is possible to execute the search method according to the first exemplary embodiment. In this case, a CPU (central processing unit) of the computer functions as the cluster creation unit 5, the region abstract creation unit 6, the region upper limit calculation unit 2, the word frequency calculation unit 3, and the document frequency reference unit 4, and performs the processes.

Moreover, in the first exemplary embodiment, the abstract matrix storage unit 1 and the word document matrix storage unit 7 are realized by storing data files which compose them to a storage device such as a hard disk that is included in a computer, or mounting a recording medium storing this data file on a reading device connected to the computer.

[Second Exemplary Embodiment]

Figure 25:
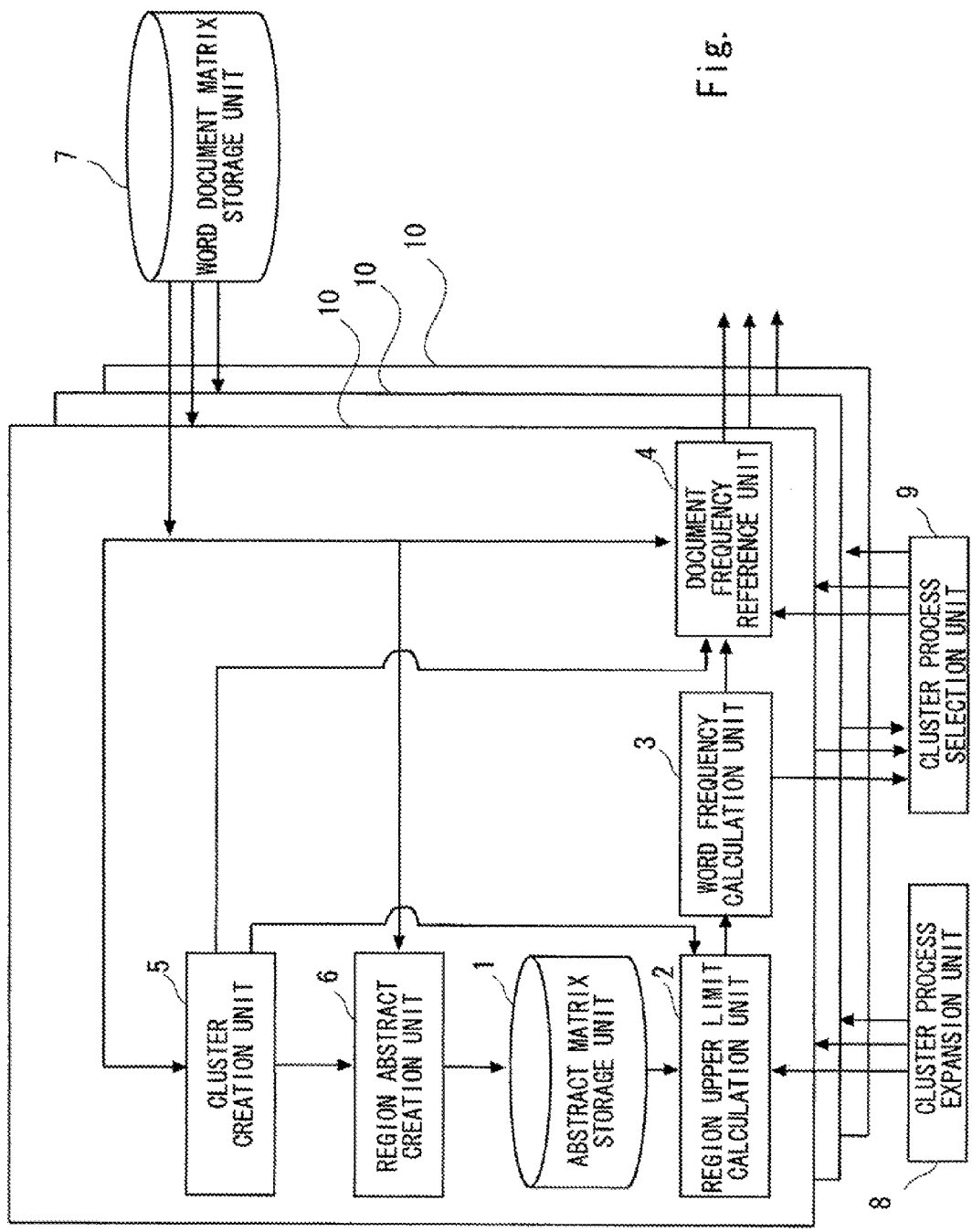
FIG. 25 is a block diagram showing a configuration of a search device according to a second exemplary embodiment of the present invention.

Next, a search device, a search: method, and a program according to a second exemplary embodiment of the present invention are explained with reference to FIGS. 25 and 26. Firstly, a configuration of the search device according to the second exemplary embodiment is explained using FIG. 25. FIG. 25 is a block diagram showing a configuration of the search device according to the second exemplary embodiment of the present invention.

As shown in FIG. 25, the search device according to the second exemplary embodiment includes a plurality of cluster processing units 10, a cluster process expansion unit 8, and a cluster processing selecting unit 9, and differs from the search device of the first exemplary embodiment shown in FIG. 4 in this point. Moreover, in the second exemplary embodiment, the cluster creation unit 5, the region abstract creation unit 6, the abstract matrix storage unit 1, the region upper limit calculation unit 2, the word frequency calculation unit 3, and the document frequency reference unit 4 are included each of the plurality of cluster processing units 10. Note that these configurations and functions are the same as those of the first exemplary embodiment.

When information representing a subset, that is, the input document list, is input from a user or an external program, the cluster process expansion unit 8 inputs the input information to the region upper limit calculation unit 2 of each cluster process unit 10.

The cluster processing selecting unit 9 receives the upper limit of the frequency of the word for each word region, which is specified by each of the word frequency calculation unit 3 of the plurality of cluster processing unit 10. Moreover, according to the distribution of the received upper limit of the frequency of each word, the cluster processing selecting unit 9 selects at least one of the plurality of cluster processing unit 10 in order to use it in the subsequent processes. Then, the cluster processing selecting unit 9 passes the upper limit specified by the word frequency calculation unit 3 of the selected cluster processing unit 10 only to the document frequency reference unit 4 of the selected cluster processing unit 10, and makes it perform the process.

Further, in the second exemplary embodiment, in each of the plurality of cluster processing unit 10, each cluster creation unit 5 executes different clustering process from each other. As described in the first exemplary embodiment, there are a plurality of kinds of algorithms in the two-dimensional clustering process. Additionally, in the two-dimensional clustering process, it is required to specify the number of word regions and the number of document regions for the process.

Therefore, according to the second exemplary embodiment, it is possible to prepare a plurality of parameters (an algorithm, the number of word regions, the number of document regions, etc.) for one word document matrix, and to perform the plurality of kinds of the two-dimensional clustering processes. In the second exemplary embodiment, it becomes possible for each of the cluster processing unit 10 to execute the plurality of kinds of the two-dimensional clustering processes with these parameters being changed. Note that the number of cluster processing units 10 is referred to as a cluster kind number.

Each cluster processing unit 10 is called by an administrator or an external program. Each cluster processing unit 10 inputs the word document matrix, and in the abstract matrix storage unit 1, outputs the upper limit of the dynamic region frequency of the word in the region when the input document list is provided or the abstract information (abstract matrix) that can calculate its estimated value to each region in the word document matrix.

Further, each cluster processing unit 10 is called by the cluster process expansion unit 8, and when the input document list is input from the cluster process expansion unit 8, specifies the upper limit of the frequency of the word for each word region, and outputs the word upper limit list to the cluster processing selecting unit 9. Furthermore, as described above, one of the cluster processing units 10 is called with the word upper limit list as an input by the cluster process selection unit 9, reads highly frequent k words in the input document list by the internal document frequency reference unit 4, and outputs it to the user or the external program.

Figure 26:
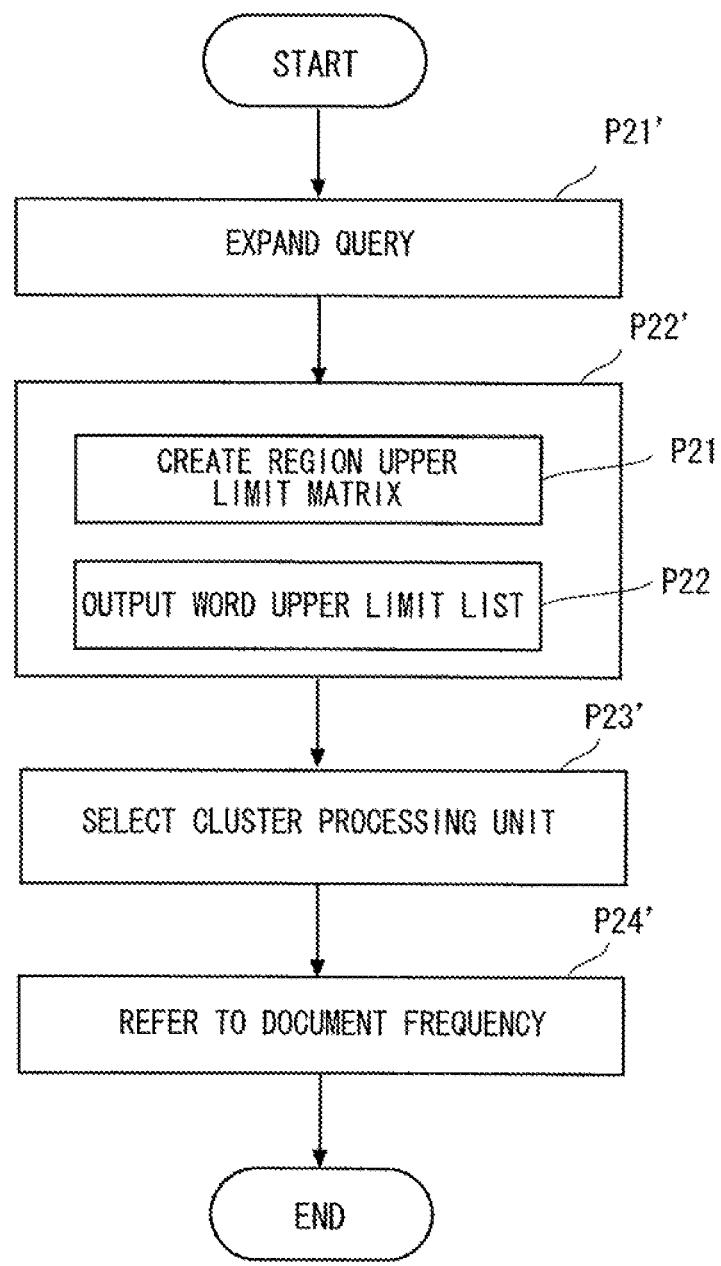
FIG. 26 is a flowchart showing processes in a search process performed by a search method according to the second exemplary embodiment of the present invention.

Next, the search method according to the second exemplary embodiment of the present invention is explained using FIGS. 26 to 28. The search method according to the second exemplary embodiment is performed by operating the search device according to the second exemplary embodiment shown in FIG. 25. Therefore, in the following explanation, an operation of the search device according to the second exemplary embodiment is also explained with reference to FIG. 25.

In the search method according to the second exemplary embodiment, two processes, which are a clustering process P10' and a search process P20' are mainly executed. Between them, the clustering process P10' is realized in each cluster processing unit 10 by performing the clustering process P10 by the cluster creation unit 5 and the region abstract creation unit 6.

Here, the search process P20' is explained using FIG. 26. FIG. 26 is a flowchart showing the process by the search process performed with the search method of the second exemplary embodiment of the present invention. The search process P20' is started when the user or the external program inputs the input document list into the cluster processing expansion unit 8.

As shown in FIG. 26, firstly when the input document list is input from outside, the cluster process expansion unit 8 passes the input document list to each cluster processing unit 10 (step P21'). In the step P21', so-called development of a query is performed.

Next, each cluster processing unit 10 creates an upper limit list using the internal region upper limit calculation unit 2 and the word region calculation unit 3 inside, and outputs it (step P22'). Note that specifically, in the step P22', in each cluster processing unit 10, the region upper limit calculation unit 2 executes the step P21 (see FIG. 19), and the word region calculation unit 3 executes the step P22 (see FIG. 19). The process of the steps P21 and P22 may be simultaneously performed in each cluster processing unit 10.

Next, using the result of the step P22', the cluster process selection unit 9 examines the word upper limit list output by each cluster processing unit 10, selects one or more cluster processing unit, and calls the document frequency reference unit 4 in the selected cluster processing unit 10 (step P23').

Subsequently, based on the result of the step P22', while narrowing down the document list for the words in each word region, the called document frequency reference unit 4 reads this. Then, the document frequency reference unit 4 specifies the k words with high frequency in the input document list, and outputs this (step P24'). In the step P24', the document frequency calculation unit 4 of the selected cluster processing unit 10 specifies characteristic words in the input document while referring to the frequency (document frequency) of each word. The process in the search process P20' ends after execution of the step P24'.

Here, the details of the process in step P23' are explained below. In the step P23', a plurality of word upper limit lists may be input, and the cluster processing unit 10 having the word maximum list with the highest reading efficiency may be selected. The evaluation of whether the efficiency of reading is favorable can be performed, for example by calculating the skewness of the distribution of the word upper limit list.

Specifically, in this case, firstly the cluster processing selection unit 9 calculates the skewness to each word upper limit list. When the upper limit value in the word maximum list where the number of word regions is m is WMax[i] $\{0<=i<m\}$, the skewness Sk is expressed by the following formula (2). Note. that "$\mu$" and "$\sigma$" in the following formula (2) can be respectively calculated by the following formula (3) and the formula (4). Furthermore, "|WC[i]|" in the following formulas (2) to (4) mean the number of the words in each word region. "|WC[i]|" is a value obtained by dividing the number of words in all word set W.

$$Sk = \frac{\sum_{i=0}^{m} |WC[i]| \times (W\text{Max}[i] - \mu)^3}{|W|\sigma^3} \quad (2)$$

$$\mu = \frac{\sum_{i=0}^{m} |WC[i]| \times W\text{Max}[i]}{|W|} \quad (3)$$

$$\sigma = \frac{1}{|W|}\sqrt{\sum_{i=0}^{m} |WC[i]| \times (W\text{Max}[i] - \mu)^2} \quad (4)$$

Next, if the skewness Sk is calculated, the cluster processing selection unit 9 selects the largest word upper limit list of the skewness Sk, and calls the document frequency reference unit 4 which outputs the word upper limit list. As a result, the cluster processing unit 10 having the word upper limit list with the highest reading efficiency is selected, and word specification is performed.

In the abovementioned example, although the cluster processing selection unit 9 selects the single cluster processing unit with large skewness, the second exemplary embodiment is not limited to this mode. In the second exemplary embodiment, it is possible that the cluster processing selection unit 9 selects the plurality of cluster processing units 10, lets the document frequency reference unit 4 in each cluster processing unit 10 perform the process, and outputs the k words only to the document frequency reference unit 4 which has completed the process the fastest. Further, in the second exemplary embodiment, it may be a mode in which each of the plurality of cluster processing units 10 are realized by different computers and the processes are performed in parallel.

As described above, according to the second exemplary embodiment, since the plurality of kinds of the two-dimensional clustering algorithms are used at the same time, it is effective in the case when the input document list that is difficult to be narrowed down is provided. To be more specific, this is because that even in such a case, the best word upper limit list is output by the plurality of kinds of the cluster processing units 10 and narrowing down is performed using this. According to the second exemplary embodiment, even in such a case, improvement in the speed of the search can be achieved.

The program according to the second exemplary embodiment of the present invention may be a program which causes a computer to execute the step P21' to the step P24'. By installing this program and executing this program, the search device according to the second exemplary embodiment is realized, and enables execution of the search method according to the second exemplary embodiment. In this case, a CPU (central processing unit) of the computer functions as the cluster creation unit 5, the region abstract creation unit 6, the region upper limit calculation unit 2, the word frequency calculation unit 3, and the document frequency reference unit 4 in each cluster processing unit 10, and performs the processes. Further, the CPU of the computer also functions as the cluster process expansion unit 8 and the cluster processing selecting unit 9, and performs the processes.

Additionally, the program according to the second exemplary embodiment may be a program which executes the steps P21' to P24' shown in FIG. 26 by a plurality of computers. In this case, as mentioned above, the CPU of each computer respectively functions as the cluster processing unit 10, and the processes are executed in parallel.

Also in the second exemplary embodiment, the abstract matrix storage unit 1 and the word document matrix storage unit 7 are realized by storing data files which compose them to a storage device such as a hard disk that is included in a computer, or mounting a recording medium storing this data file on a reading device connected to the computer.

Example 1

Here, an operation of the search device according to the first exemplary embodiment is explained using a specific example. In addition, in the example 1, a case is explained in which the region abstract creation unit 6 functions as the maximum abstract creation unit which creates the abstract matrix shown in FIG. 9. Hereinafter, the clustering process P10 and the search process P20 in the example 1 are explained. Note that as a premise for explaining the following operation example, information shown in FIGS. 5A and 5B shall be held 7o the word document matrix storage unit 7, and a parameter k=3.

First, the clustering process is explained. When a direction of execution of P10 is made by a user or an external program, the cluster creation unit 5 reads the word document matrix shown in FIG. 2, and performs the two-dimensional clustering process (step P11). As a result, the word region list shown in FIG. 6A and the document region list shown in FIG. 6B are output. Therefore, logically, the region shown in FIG. 3 is created. However, in the example of FIG. 3, although only the division for a part of the word document matrix is shown, actually it is divided into regions of the number of word regions 4 × the number of document regions 4.

Next, the maximum abstract creation unit executes the creation process (step P12) of the abstract matrix according to the word region list and the document region list. Specifically, the maximum abstract creation unit executes the step P1201 to the step P1203, and stores the information shown in FIG. 9 to the abstract matrix storage unit 1.

As described above, in the example 1, the words and documents in the same tendency are collected by the clustering process, and an efficient abstract matrix is created.

Next, the search process P20 is explained. When the input document list D={1, 2, 3, 7. . . } is input to the region upper limit calculation unit 2 by the user or the external program, the search process P20 is executed. Accordingly, the region upper limit calculation unit 2 refers to the abstract matrix shown in FIG. 9, and executes the process (P210) to calculate the region upper limit.

In P210, firstly the region upper limit calculation unit 2 refers to the document region list shown in FIG. 6B for the documents in the input document list. Then, the region upper limit calculation unit 2 outputs the number of documents included in the input document as DCF for each of the four document regions (step P2101). DCF in this case shall be {19, 35, 3, 2} in order.

Next, the region upper limit calculation unit 2 performs the processes of the steps P2102 to P2106, and outputs the region upper limit matrix. The region upper limit matrix at this time is shown in FIG. 11. After that, the word frequency calculation unit 3 creates the word upper limit list shown in FIG. 12 (step P22).

Next, the document frequency reference unit 4 processes the step P23 (see FIG. 19) according to the word upper limit list of FIG. 12. In the step P23, the process of the step P2302 (see FIG. 23) is performed to the word region WC [1] where the upper limit is the largest within the word upper limit list. As a result, suppose that the word "crime" of document frequency 34, the word "voluntary surrender" of document frequency 31, and the word "death" of document frequency 25 for the input document are added to the word list W.

Further, in the step P2304, a comparison is performed between the document frequency 25, which is the third place in the word list W, and the upper limit 27 of the word region WC[0] with the second largest upper limit in the word upper limit list. In this case, since the document frequency 25 of the third place in the word list W is smaller, "q" is updated to two (step P2307), and the process of the step P2302 is performed again.

As a result, suppose that the word exceeding the document frequency 25 shall not be discovered, and the word list W shall remain to be "crime", "voluntary surrender", and "death". After that, the process of the step P2304 is performed again, the comparison is performed between the document frequency 25 of the third place in the word list W and the upper limit 3 of the word region WC[3] with the third largest upper limit, and the step P2305 is executed. This is because that the words in other word regions which are not examined at this time are evaluated that the document frequency thereof is only six and further reference processes will be unnecessary. Accordingly, the document frequency reference unit 4 outputs three words, which are "crime", "voluntary surrender", and "death" in the step P2305, and ends the process.

Thus, according to the search device in the example 1, the word region which should be read at the time of search can be narrowed down, and the search speed can be improved.

Example 2

Next, an operation of another example of the search device according to the first exemplary embodiment is explained. In the example 2, a case is explained in which the region abstract creation unit 6 functions as a vector abstract creation unit which creates the abstract matrix shown in FIG. 10. Note that the premise for explaining the operation example in the example 2 is the same as that of the abovementioned example 1, the information shown in FIGS. 5A and 5B is held to the word document matrix storage unit 7, and the parameter k=3.

As the step P11 in the clustering process P10 is the same as the abovementioned example 1, it is omitted and the step P12 is focused here. In the example 2, in the step P12, the process P1202 (see FIG. 17) using the vector abstract creation unit is executed after the process of the step P1201, unlike the example 1 using the abovementioned maximum abstract creation unit. As a result, the information shown in FIG. 10 is stored to the abstract matrix storage unit 1.

In the search process P20, the region upper limit calculation unit 2 executes a different process (P211 (see FIG. 21)) from the example 1, in the step P21. At this time, a bitstream DCB[j]{0<=j<4} of a length four among the input document list is created, however in the example 2, it shall be DCB[3]= {1, 1, 0, 1, 0. . . } for the following explanation.

Next, although the region upper limit calculation unit 2 performs the processes of steps P2112 to P2114, only the process to the region C[0][3] is covered. Firstly the region upper limit calculation unit 2 reads the bitstream B from the abstract matrix storage unit 1 in P2112. The bitstream B at this time is {0, 0, 1, 0, 1} which is indicated in the upper right cell of FIG. 10. When the AND operation of this bitstream B and the dynamic bitstream DCB[3] is performed, it is {0, 0, 0, 0, 0} and CMax [0][3] can be estimated smaller. For example, the region upper limit matrix obtained by this process is shown in FIG. 11.

As a result, it can be seen that there is almost no consistency between a set of documents including the words in the region represented by the bitstream B, and the input document set, thus CMax [0][3] can be estimated smaller, and for example, it can be CMax[0][3]=0. After that, when the step P22 is performed, the upper limit can be 20 for the word region WC[0], and the reference process (step P2303) for the word region WC[0] can be omitted at the time of the reference process of the document frequency in the step P23.

As mentioned above, the search device of the example 1 uses the maximum value of the static region frequency in the region as the abstract matrix. This attempts the improvement in the speed by the region upper limit calculation unit 2 that narrows down based on the information that the word included in the region appears only X times. The example 1 is effective when X is small enough, however depending on the characteristics of the document set, X may become large.

On the other hand, in the search device of the example 2, a comparison is performed between the document set actually including the words in the region and the input document when calculating the upper limit value of the dynamic region frequency for each region. Then, in the case that X is large, if distribution of the document set and the input document differ, the upper limit in the region can be estimated small.

Example 3

Next, an operation of the search device according to the second exemplary embodiment is explained. Here, an operation is explained focusing on the process of the step P23' (see FIG. 26). For example, suppose that two word upper limit lists shown in FIGS. 27A and 27B are obtained in the step P22'. FIGS. 27A and 27B are views showing an example of the word upper limit list obtained in the example 2, and FIGS. 27A and 27B show the word upper limit list obtained by different two-dimensional clustering processes from each other.

Specifically, FIG. 27A shows the result obtained by the two-dimensional clustering process of 4×4. On the other hand, FIG. 27B shows the result obtained by the two-dimensional clustering process of 5×5. At this time, if k=3, when performing the reference of the document frequency shown in FIG. 27A, it seems that the process can be completed only by referring to 25 words in the word region WC[0].

On the other hand, when performing the reference of the document frequency shown in FIG. 27B, it seems that reference to total of 40 words in the word regions WC[0] and the word region WC[1] is required. Therefore, in this case, the process of the step P24' (see FIG. 26) should be performed to the result of FIG. 27A.

In this case, the cluster processing selecting unit 9 calculates the skewness for each cluster processing unit 10. The skewness to the result of FIG. 27A is calculated by the formula 2 as about 1.1. Similarly, the skewness for the result of FIG. 27B is calculated by the formula 2 as about 0.5. Accordingly, the cluster processing selecting unit 9 selects the cluster processing unit 10 which output FIG. 27A, and can execute the reference process (step P24') of the document frequency.

As described above, according to the example 2, a plurality of different kinds of cluster processing units 10 are included. Accordingly, by the word upper limit list output by each, it is possible to select the cluster processing unit 10 which can narrow down most word regions by the input document list, and the search speed can be further improved.

Additionally, it is needless to say that the present invention is not limited to the above exemplary embodiments, but various modifications can be made without departing from the abovementioned scope of the present invention. For example, in the abovementioned exemplary embodiments, although the present invention is explained as a configuration of hardware, the present invention is not limited to this. The present invention can also be realized by causing a CPU (Central Processing Unit) to execute arbitrary processes. In this case, the computer program can be recorded on a recording medium to be provided, or may be transmitted via the Internet and other transmission media to be provided. Moreover, the recording medium includes, for example, flexible disks, hard disks, magnetic disks, magneto-optical discs, CD-ROM (Compact Disc Read Only Memory), DVD (Digital Versatile Disc), BD (Blu-ray (registered trademark) Disc), ROM (Read Only Memory) cartridges, RAM to (Random Access Memory) memory cartridges with a battery back-up, flash memory cartridges, nonvolatile RAM cartridges, etc. Further, the communication media includes cable communication media such as telephone lines, and wireless communication media such as microwave links.

INDUSTRIAL APPLICABILITY the present invention can be applied to the search engine called an associative search engine, and is effective when searching for a highly frequent word representing a concept of a deep relationship with a document set expressed by a certain query in a text mining system and a search engine. The present invention has industrial applicability.

REFERENCE SIGNS LIST

1 ABSTRACT MATRIX STORAGE UNIT
2 REGION UPPER LIMIT CALCULATION UNIT
3 WORD FREQUENCY CALCULATION UNIT
4 DOCUMENT FREQUENCY REFERENCE UNIT
5 CLUSTER CREATION UNIT
6 REGION ABSTRACT CREATION UNIT
7 WORD DOCUMENT MATRIX STORAGE UNIT
8 CLUSTER PROCESS EXPANSION UNIT
9 CLUSTER PROCESS SELECTION UNIT
10 CLUSTER PROCESSING UNIT

The invention claimed is:

1. A search apparatus including a central processing unit, comprising:
a cluster creation unit that creates a plurality of regions from a word document matrix specifying a co-occurrence relationship between a word set and a document set, by dividing the word set and the document set into a plurality of subsets;
a region abstract creation unit that calculates, for each of the plurality of regions, a region frequency representing a number of documents including a word in each region, creates an abstract matrix specifying each region frequency for each region, and stores the created abstract matrix into an abstract matrix storage unit;
a region upper limit calculation unit that, when information representing at least one subset of the plurality of subsets is input, examines a relationship between the information representing the at least one subset of the plurality of subsets and the plurality of regions, refers to abstract information for each of the plurality of regions from the obtained result of the relationship, and calculates, for each of the plurality of regions, an upper limit value of the frequency of the word included in each of the plurality of regions for the at least one subset of the plurality of subsets;
a word frequency calculation unit that sums the upper limit value of the frequency of the word for each region with a common word in the plurality of regions, and specifies the summed value as the upper limit value of the frequency of the word for each region with the common word; and
a document frequency reference unit that determines a region to be searched in the plurality of regions according to the upper limit value of the frequency of the word for each region with the common word, and further specifies a top number of words with high frequency according to the determined region to be searched, and outputs the specified top number of words with high frequency as characteristic words in the at least one subset of the plurality of subsets.

2. The search apparatus according to claim 1, wherein
the region abstract creation unit, for each of the plurality of regions, obtains at least the frequency in the region of the word included in each region, and further specifies a maximum value of the obtained frequency in the region of the word, and sets the specified maximum value as the abstract information, and
the region upper limit calculation unit, for each of the plurality of regions, obtains a number of the documents composing the at least one subset of the plurality of subsets included in the region as a relationship between the information representing the at least one subset of the plurality of subsets and the plurality of regions, compares the obtained number of documents and the maximum value of the frequency for the region, and calculates the upper limit value of the frequency according to a comparison result.

3. The search apparatus according to claim 1, wherein
the region abstract creation unit, for each of the plurality of regions, obtains at least a first bitstream indicating whether the word in the region is included in the document of each region, and sets the obtained first bitstream as the abstract information, and
the region upper limit calculation unit, for each of the plurality of regions, obtains a second bitstream indicating whether the document composing the at least one subset of the plurality of subsets is included in the region as the relationship between the information representing the at least one subset of the plurality of subsets and the plurality of regions, executes an AND operation between the second bitstream obtained by the region upper limit calculation unit and the first bitstream obtained by the region abstract creation unit, and calculates the upper limit value of the frequency according to a result of the AND operation.

4. The search apparatus according to claim 1, further comprising:
a plurality of cluster processing units;
a cluster process expansion unit; and
a cluster process selection unit, wherein
the cluster creation unit, the region abstract creation unit, the abstract matrix storage unit, the region upper limit calculation unit, the word frequency calculation unit, and the document frequency reference unit are included in each cluster processing unit of the plurality of cluster processing units,
each said cluster creation unit, included in each said cluster processing unit of the plurality of cluster processing units, performs a different clustering process from each other,
when the information representing the at least one subset of the plurality of subsets is input, the cluster process expansion unit inputs the information representing the at least one subset of the plurality of subsets into each of the region upper limit calculation unit of the plurality of cluster processing units, and
the cluster process selection unit receives the upper limit value of the frequency of the word for each region with the common word, which is specified by the word frequency calculation unit in each of the plurality of cluster processing units, and selects at least one of the plurality of cluster processing units according to distribution of the upper limit value of the frequency of the received each word, and makes only the document frequency reference unit of the selected cluster processing unit perform the process.

5. A search method comprising:
(a) creating a plurality of regions from a word document matrix specifying a co-occurrence relationship between a word set and a document set, by dividing the word set and the document set into a plurality of subsets;
(b) calculating, for each of the plurality of regions, a region frequency representing a number of documents including a word in each region, creating an abstract matrix specifying each region frequency for each region, and storing the created abstract matrix into an abstract matrix storage unit;
(c) when information representing at least one subset of the plurality of subsets is input, examining a relationship between the information representing the at least one subset of the plurality of subsets and the plurality of regions, referring to abstract information for each of the plurality of regions from the obtained result of the relationship, and calculating, for each of the plurality of regions, an upper limit value of the frequency of the word included in each of the plurality of regions for the at least one subset of the plurality of subsets;
(d) summing the upper limit value of the frequency of the word for each region with a common word in the plurality of regions, and specifying the summed value as the upper limit value of the frequency of the word for each region with the common word; and
(e) determining a region to be searched in the plurality of regions according to the upper limit value of the frequency of the word for each region with the common word, further specifying a top number of words with high frequency according to the determined region to be searched, and outputting the specified top number of words with high frequency as characteristic words to the at least one subset of the plurality of subsets.

6. The search method according to claim 5, wherein:
in the creating of (a), for each of the plurality of regions created, at least the frequency in the region of the word included in each region is obtained, a maximum value of the obtained frequency in the region of the word is specified, and the specified maximum value is set as the abstract information, and
in the calculating of (c), for each of the plurality of regions, a number of documents is obtained that compose the at least one subset of the plurality of subsets included in the region as a relationship between the information representing the at least one subset of the plurality of subsets and the plurality of regions, the obtained number of documents is compared with the maximum value of the frequency for the region, and the upper limit value of the frequency is calculated according to a comparison result.

7. The search method according to claim 5, wherein:
in the creating of (a), for each of the plurality of regions created, at least a first bitstream is obtained that indicates whether the word in the region is included in the document of each region, and the obtained first bitstream is set as the abstract information, and
in the calculating of (c), for each of the plurality of regions, a second bitstream is obtained that indicates whether the document composing the at least one subset of the plurality of subsets is included in the region as the relationship between the information representing the at least one subset of the plurality of subsets and the plurality of regions, an AND operation is executed between the obtained second bitstream and the first bitstream obtained in the creation of (a), and the upper limit value of the frequency is calculated according to a result of the AND operation.

8. The search method according to claim 5, wherein, for each of a plurality of clustering process types, (a) through (d) are executed with at least one upper limit value of the frequency of the word for each region with the common word being selected from the upper limit value of the frequency of the word for each region with the common word, and the output of (e) including the selected upper limit value.

9. A non-transitory recording medium storing a program for causing a computer to execute:
(a) creates a plurality of regions from a word document matrix specifying a co-occurrence relationship between a word set and a document set, by dividing the word set and the document set into a plurality of subsets;
(b) a process that calculates, for each of the plurality of regions, a region frequency representing a number of documents including a word in each region, creates an abstract matrix specifying each region frequency for each region, and stores the created abstract matrix into an abstract matrix storage unit;
(c) a process that, when information representing the at least one subset of the plurality of subsets is input, examines a relationship between the information representing the at least one subset of the plurality of subsets and the plurality of regions, refers to abstract information for each of the plurality of regions from the obtained result of the relationship, and calculates, for each of the plurality of regions, an upper limit value of the frequency of the word included in each of the plurality of regions for the at least one subset of the plurality of subsets;
(d) a process that sums the upper limit value of the frequency of the word for each region with a common word in the plurality of regions, and specifies the summed value as the upper limit value of the frequency of the word by each region with the common word; and
(e) a process that determines a region to be searched in the plurality of regions according to the upper limit value of the frequency of the word for each region with the common word, further specifies a top number of words with high frequency according to the determined region to be searched, and outputs the specified top number of words with high frequency as characteristic words to the at least one subset of the plurality of subsets.

10. The non-transitory recording medium storing the program according to claim 9, wherein:
in the process of (a), for each of the plurality of regions created, at least the frequency in the region of the word included in each region is obtained, further a maximum value of the obtained frequency of the word is specified, and the specified maximum value is set as the abstract information, and
in the process of (c), for each of the plurality of regions, a number of documents is obtained that compose the at least one subset of the plurality of subsets included in the region as a relationship between the information representing the at least one subset of the plurality of subsets and the plurality of regions, the obtained number of documents is compared with the maximum value of the frequency for the region, and the upper limit value of the frequency is calculated according to a comparison result.

11. The non-transitory recording medium storing the program according to claim 10, wherein:
in the process of (a), for each of the plurality of regions created, at least a first bitstream is obtained that indicates whether the word in the region is included in the document of each region, and the obtained first bitstream is set as the abstract information, and
in the process of (c), for each of the plurality of regions, a second bitstream is obtained that indicates whether the document composing the at least one subset of the plurality of subsets is included in the region as the relationship between the information representing the at least one subset of the plurality of subsets and the plurality of regions, an AND operation is executed between the obtained second bitstream and the first bitstream obtained in the process of (a), and the upper limit value of the frequency is calculated according to a result of the AND operation.

12. The non-transitory recording medium storing the program according to claim 9, wherein, for each of a plurality of clustering process types, (a) through (d) are executed with at least one upper limit value of the frequency of the word for each region with the common word being selected from the upper limit value of the frequency of the word for each region with the common word, and the process of (e) includes the selected upper limit value.

13. A search apparatus including a central processing unit, comprising:
a cluster creation unit that creates a plurality of regions from a word document matrix specifying a co-occurrence relationship between a word set and a document set, by dividing the word set and the document set into a plurality of subsets;

a region abstract creation unit that calculates, for each of the plurality of regions, a region frequency representing a number of documents including a word in each region, creates an abstract matrix specifying each region frequency for each region, and stores the created abstract matrix into an abstract matrix storage unit;

a calculator that, when the information representing the at least one subset of the plurality of subsets is input, examines a relationship between the information representing the at least one subset of the plurality of subsets and the plurality of regions, refers to abstract information for each of the plurality of regions from the obtained result of the relationship, and calculates, for each of the plurality of regions, an upper limit value of the frequency of the word included in each of the plurality of regions for the at least one subset of the plurality of subsets;

a word frequency calculator that sums the upper limit value of the frequency for each region with a common word in the plurality of regions, and specifies the summed value as the upper limit value of the frequency of the word for each region with the common word; and a document frequency reference device that determines a region to be searched in the plurality of regions according to the upper limit value of the frequency of the word for each region with the common word, and further specifies a top number of words with high frequency according to the determined region to be searched, and outputs the specified top number of words with high frequency as characteristic words in the at least one subset of the plurality of subsets.

* * * * *